(12) United States Patent
Ishibashi et al.

(10) Patent No.: US 7,088,050 B2
(45) Date of Patent: Aug. 8, 2006

(54) DISPLAY DEVICE AND PORTABLE TERMINAL USING THE SAME

(75) Inventors: Osamu Ishibashi, Tokyo (JP); Hiroshi Hayama, Tokyo (JP); Hiroshi Kanou, Tokyo (JP); Shunji Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/074,065

(22) Filed: Mar. 8, 2005

(65) Prior Publication Data

US 2005/0200298 A1  Sep. 15, 2005

(30) Foreign Application Priority Data

Mar. 15, 2004 (JP) ............................. 2004-072424
Sep. 15, 2004 (JP) ............................. 2004-268949

(51) Int. Cl.
*G09G 3/10* (2006.01)

(52) U.S. Cl. ............... 315/169.1; 349/58; 349/150; 345/204

(58) Field of Classification Search ............ 315/169.1, 315/169.3, 169.4; 349/58, 158, 149–152; 345/204, 206, 214

See application file for complete search history.

(56) References Cited

U.S. PATENT DOCUMENTS 5,432,626 A * 7/1995 Sasuga et al. ................ 349/58
5,640,216 A * 6/1997 Hasegawa et al. ............ 349/58

FOREIGN PATENT DOCUMENTS

| JP | 3033124 | 2/2000 |
|---|---|---|
| JP | 2000-214477 A | 8/2000 |
| JP | 2001-056479 A | 2/2001 |
| JP | 2002-131772 A | 5/2002 |
| JP | 2002-132222 A | 5/2002 |
| JP | 2002-139739 A | 5/2002 |

* cited by examiner

*Primary Examiner*—Haissa Philogene
(74) *Attorney, Agent, or Firm*—Dickstein, Shapiro, Morin & Oshinsky, LLP.

(57) ABSTRACT

An object is to narrow the width a frame part provided to a display device. The display device of the present invention comprises: a main substrate having display pixels being arranged in matrix, a scanning line electrode array, a signal line electrode array, and a frame part formed in an edge of the substrate along the scanning line electrode array and the signal line electrode array; a scanning line driving element mounted to the frame part along the scanning line electrode array; a signal line driving element mounted to the frame part along the signal line electrode array; and a flexible flat cable for supplying a signal and a power to the driving circuits of the scanning line driving element and the signal line driving element. The width of the frame part to which the signal line driving element is mounted is approximate to the width of the signal line driving element, and the width of the frame part to which the scanning line driving element is mounted is approximate to the width of the scanning line driving element. The length of at least the scanning line driving element or the signal line driving element is set shorter than the respective frame part so as to keep a space for mounting the flexible flat cable.

24 Claims, 26 Drawing Sheets

DISPLAY DEVICE AND PORTABLE TERMINAL USING THE SAME

BACKGROUND OF THE INVENTION

1. Field of the Invention

The present invention relates to a display device comprising a scanning line driving element, a signal line driving element, and a flexible flat (Flexible Printed Circuit; FPC) cable being mounted in a frame part which is outside a display pixel region of a main substrate, and more specifically, to a mounting technique which enables to save a space of the frame part.

2. Description of the Related Art

Recently, in the field of liquid crystal display panels which are formed by sandwiching and sealing a liquid crystal layer with two glass substrates, practically used is a liquid crystal display device which comprises a scanning line driving element and a signal line driving element mounted in a region (referred to as a "frame part" hereinafter), which is out of the display pixel region in the periphery of one of the glass substrates and also is a region which is not covered by the other counter glass substrate. The driving elements are mounted to be adjacent to the longitudinal side and the lateral side of the display pixel region and on the glass substrate having the length corresponding to the lengths of the sides, a driving circuit having thin-film transistors is formed.

For example, a conventional liquid crystal display device disclosed in Japanese Patent No. 3033124 (page 5, FIG. 2) employs a structure in which a scanning line driving element having a scanning line driving circuit formed with thin-film transistors on a heat-resistant glass substrate and also a signal line driving element having a signal line driving circuit formed with thin-film transistors on a heat-resistant glass substrate are mounted in a frame part of the liquid crystal display panel.

As shown in FIG. 1 and FIG. 2, the liquid crystal display panel of the conventional liquid crystal display device is formed with a glass substrate 1 and a glass substrate 2 which are placed opposite with a liquid crystal layer in between. On the surface of the glass substrate 1, formed are a plurality of thin-film transistors for applying a voltage to display pixel electrode, a plurality of scanning lines 16 for electrically selecting the thin-film transistors, and a plurality of signal lines 17 orthogonal to the scanning lines 16. On the surface of the glass substrate 2, counter electrodes for the display pixel electrodes are formed. Further, a scanning line electrode array 16a in which a plurality of scanning line electrodes are arranged is provided in one side of the glass substrate 1, while a signal line electrode array 17a in which a plurality of signal line electrodes are arranged is provided in other side of the glass substrate 1, which crosses the side where the scanning line electrode array 16a is provided.

Further, a scanning line driving element 3 of the conventional liquid crystal display device is mounted to a frame part 16b on the scanning line electrode array 16a side of the glass substrate 1, which comprises lines of scanning line driving output terminals 18 of the driving circuit arranged by the same pitch as that of the scanning line electrode array 16a of the glass substrate 1. These output terminals 18 are connected to the respective scanning line electrodes. In the same manner, a signal line driving element 4 of the conventional liquid crystal display device is mounted to a frame part 17b on the signal line electrode array 17a side of the glass substrate 1, which comprises lines of signal line driving output terminals 20 of the driving circuit arranged by the same pitch as that of the signal line electrode array 17a of the glass substrate 1. These output terminals 20 are connected to the respective signal line electrodes.

Input terminals 19, 21 are formed in one edge part of the glass substrate of the signal line driving element, and the input terminals 19, 21 are connected to link wirings 24, 25 provided in a corner of the glass substrate 1. The link wirings 24, 25 are made of an aluminum wire and/or a chrome wire and/or a copper wire. In one edge of the corner of the glass substrate 1, connecting terminals 22, 23 being electrically connected to the link wirings 24, 25 are arranged. An FPC cable 5 for connecting to an outer circuit is connected to the connecting terminals 22, 23.

The scanning line driving output terminals 18 of the scanning line driving element 3 and the scanning line electrodes of the glass substrate 1 are arranged by the same pitch. Likewise, the signal line driving output terminals 20 of the signal line driving element 4 and the signal line electrodes of the glass substrate 1 are arranged by the same pitch. Therefore, it is possible to wire the scanning line driving output terminals 18 and the scanning line electrodes and to wire the signal line driving output terminals 20 and the signal line electrodes by the minimum distance.

However, there are some drawbacks in the liquid crystal display device disclosed in Japanese Patent No. 3033124.

A first drawback is that the width of the frame part cannot be reduced because of the width of the FPC cable for connecting to the outer circuits. The reason is as follows. In accordance with the recent technical developments, the widths of the glass substrates of the scanning line driving element and the signal line driving element have been narrowed to 4 mm or less. On the glass substrates of the scanning line driving element and the signal line driving element, it is necessary to provide wirings for supplying power supply and the like to four-system power source and GND, eighteen video signals, ten gradation voltages, sixteen control signals, two clock signals, and counter electrodes for display pixel electrodes of a liquid crystal display panel. Provided that a copper wiring (wiring width=40 μm, wiring pitch=80 μm, wiring thickness=9 μm) is provided on both faces, an FPC cable with a length of 10 cm is used for connecting to the outer circuit, and an electric current of 50 mA is flown to the four-system power sources and to the power source of the counter electrodes, the specific resistance of the copper wiring becomes $1.7 \times 10^{-8}$ [Ω·m] for suppressing the voltage drop in the FPC cable to be 0.02 V or less. Thus, twelve wirings or more are required for the power source. Similarly, if an electric current of 100 mA is flown to the GND, twenty-four wirings or more are required for the GND so as to suppress the voltage drop in the FPC cable to be 0.02 V or less. Accordingly, there are one-hundred and thirty copper wirings or more in total for the FPC cable and sixty-five wirings or more on one face of the substrate, so that the width of the FPC cable becomes 5.2 mm or more. Thus, even though the width of the glass substrate of the driving element becomes as narrow as 4 mm or less, the width of the FPC cable is wider than this. Therefore, it is necessary to widen the width of the frame part for connecting the FPC cable.

Further, the width of the frame part cannot be narrowed since the width of the glass substrate cannot be narrowed. The reason is as follows. In accordance with the recent technical developments, it is possible to manufacture a glass substrate with the length substantially equal to the length of one side of a liquid crystal display panel. For example, in a twelve-inch XGA panel (1024×768), the length of the glass substrate of a signal line driving element is about 250 mm.

Provided that two-system power source and GND are wired within the glass substrate by a copper wiring with the wiring thickness of 20 μm, and an electric current of 50 mA is flown to the two-system power source, the specific resistance of the copper wiring is $1.7 \times 10^{-8}$ [Ω·m] for suppressing the voltage drop in the power source wiring to be 0.02 V or less. Thus, it is necessary for the copper wirings of each power source to be in the thickness of 0.53 mm or more. Accordingly, the total width of the wirings of the two-system power source and the wirings of the GND becomes 2.12 mm or more. Therefore, the width of the glass substrate cannot be reduced to less than 2.12 mm at least.

A second drawback is that there are dispersions in the transmission time of a plurality of the driving signals outputted from the driving circuit, since the length of the glass substrate is long. The reason is as follows. In accordance with the recent technical developments, it is possible to manufacture a glass substrate with the length substantially equal to one side of a display pixel region. For example, in a 12-inch XGA panel (1024×768), the length of the glass substrate of a signal line driving element is about 250 mm. Therefore, in the terminal positioned in the farthest distance from an input terminal of the glass substrate, the supplied power supply voltage drops due to the influence of the supply wiring resistance. Thus, the delay time of the outputted driving signals is increased.

A third drawback is that it becomes difficult to align the positions of the terminals with each other when mounting the scanning line driving element and the signal line driving element onto the frame part, because of the structure in which the input terminals are positioned in the shorter side of the glass substrates of each driving element and the output terminals are positioned in the longer side. The reason is as follows. In accordance with the recent technical developments, the width of the glass substrate is narrowed to be as small as 4 mm or less. However, there are forty input signals or more in the signal line driving element so that the pitch of the input terminals becomes 100 μm or less. Further, in accordance with the improved resolution of the liquid crystal display panel, the pitch of the signal lines in the liquid crystal display panel is also narrowed. For example, in a 12-inch XGA panel (1024×768), the pitch of the output terminals in the signal line driving element becomes 80 μm.

A fourth drawback is that the reliability of the display device becomes insufficient, which depends on the reliabilities of the scanning line driving element and the signal line driving element. The reason is as follows. In accordance with the recent technical developments, thin-film transistors formed on the glass substrate are micronized so that the number of the thin-film transistors which can be formed on a single glass substrate is increased. For example, the number of the thin-film transistors mounted to the signal line driving element is 2,000,000 or more. Therefore, the rate of generating defected glass substrate due to the defect of the thin-film transistors is increased.

A fifth drawback is that the drop in the power supply voltage within the glass substrate of the driving element is increased due to an increase in the scale of the circuit of the glass substrate. The reason is as follows. In accordance with the recent technical developments, the thin-film transistors forming the driving circuit glass substrate are micronized to be as fine as some μm or less so that the number of the thin-film transistors formed on a single glass substrate is increased. For example, the number of the thin-film transistors forming the glass substrate of the signal line driving circuit is 2,000,000 or more. Therefore, the current consumption within the glass substrate is increased and the power supply voltage to be supplied is dropped due to the influence of the supply wiring resistance.

SUMMARY OF THE INVENTION

A first object of the present invention is to provide a display device which enables to reduce the space of a frame part of a display panel, to which a scanning line driving element, a signal line driving element, and an FPC cable are mounted. A second object of the present invention is to provide a display device which can reduce the difference in the delay time of a plurality of signals outputted from the driving circuit. A third object of the present invention is to provide a display device which can improve the productivity. A fourth object of the present invention is to provide a display device which can improve the reliability. A fifth object of the present invention is to provide a display device which can reduce the drop in the power supply voltage within the glass substrate.

In order to achieve the foregoing objects, the display device of the present invention comprises:

a main substrate having a plurality of display pixels being arranged in matrix at intersection points of a plurality of scanning lines and a plurality of signal lines, a scanning line electrode array formed with a plurality of electrodes being connected to a plurality of the scanning lines, a signal line electrode array formed with a plurality of electrodes being connected to a plurality of the signal lines, and a frame part formed in an edge of the substrate along the scanning line electrode array and the signal line electrode array;

a scanning line driving element having a driving circuit for electrically selecting the scanning lines by being mounted to the frame part along the scanning line electrode array;

a signal line driving element having a driving circuit for electrically selecting the signal lines by being mounted to the frame part along the signal line electrode array; and a flexible flat cable for supplying a signal and a power to the driving circuits of the scanning line driving element and the signal line driving element, wherein the scanning line driving element and the signal line driving element have the driving circuits formed with polycrystalline silicon thin-film transistors on a sub-substrate whose thermal expansion coefficient is approximate to that of the main substrate;

a width of the frame part to which the signal line driving element is mounted is approximate to a width of the signal line driving element, and a width of the frame part to which the scanning line driving element is mounted is approximate to a width of the scanning line driving element; and a length of at least the scanning line driving element or the signal line driving element is set shorter than the respective frame part so as to keep a space for mounting the flexible flat cable.

As described above, the space for mounting the flexible flat cable is maintained by setting the width of the frame part to which the signal line driving element is mounted to be approximate to the width of the signal line driving element, the width of the frame part to which the scanning line driving element is mounted to be approximate to the width of the scanning line driving element, and a length of at least the scanning line driving element or the signal line driving element shorter than the respective frame part.

Thereby, it becomes unnecessary to expand the length and the width of the frame part for mounting the flexible flat cable.

A plurality of the output terminals and input terminals of the driving circuit provided to the shortened scanning line driving element are arranged in the direction along the scanning line electrode array, and a plurality of the output terminals and input terminals of the driving circuit provided to the shortened signal line driving element are arranged in the direction along the signal line electrode array. In this case, the pitch of a plurality of the electrodes on the scanning line electrode array may be narrowed in accordance with the pitch of a plurality of the output terminals provided to the driving circuit of the scanning line driving element, and the pitch of a plurality of the electrodes on the signal line electrode array may be narrowed in accordance with the pitch of a plurality of the output terminals provided to the driving circuit of the signal line driving element. And the electrodes of the scanning line electrode array may be connected to the scanning lines by link lines in different lengths, and the electrodes of the signal line electrode array may be connected to the signal lines by link lines in different lengths.

As described above, a plurality of the output terminals of the driving circuits are arranged in the directions along the scanning line electrode array and the signal line electrode array, respectively, so that the direction of aligning the output terminals of the driving circuits and the electrode array is specified to be in one direction when the scanning line driving element and the signal line driving element are mounted onto the frame part respectively.

As described above, a plurality of the input terminals of the driving circuit provided to the scanning line driving element are arranged along the side where the output terminals are provided. Thereby, the aligning direction of the input terminals and that of the output terminals become the same.

As described above, by adjusting the pitch of a plurality of the electrodes in the electrode array and the pitch of the output terminals of the driving circuit, and connecting the electrodes of the scanning line electrode array to the scanning lines by the link lines in the different length and also connecting the electrodes of the signal line electrode array to the signal lines by the link lines in the different length, it becomes possible to suppress the signal delay due to the positions of the electrodes of the electrode array.

As described above, the space for mounting the flexible flat cable can be variously selected according to instruments to which the display device is mounted.

As described above, when the space is kept in between the shortened and adjacent driving elements, the number of the driving circuits provided to each driving element is reduced in accordance with the number of the driving elements, so that the signals transmitted in a display period or within a display period is reduced as well. Further, when the driving element is divided, the current consumption is reduced and the drop in the power supply voltage is reduced.

With the present invention, even if the width of the frame part provided to the main substrate is narrowed compared to the conventional case, the FPC cable can be connected. Therefore, it enables to reduce the size of the display device.

Further, when mounting the scanning line driving element and the signal line driving element onto the frame part, respectively, it is possible to align the positions of the output terminals, input terminals of the driving circuits, and the electrode array of the main substrate with high precision by specifying their aligning directions to one direction. Therefore, the reliability of the device can be improved.

Further, by adjusting the pitch of a plurality of the electrodes in the electrode array and the pitch of the output terminals of the driving circuits, and connecting the electrodes of the scanning line electrode array to the scanning lines by the link lines in the different length and also connecting the electrodes of the signal line electrode array to the signal lines by the link lines in the different length, it is possible to suppress the signal delay to be less by adjusting the length of the signal transmission paths from each electrode to the scanning line and the signal line.

Further, the space for mounting the flexible flat cable can be variously selected according to instruments to which the display device is mounted.

Further, by keeping the space in between the shortened and adjacent driving elements, the number of the driving circuits provided to each driving element can be reduced in accordance with the number of the driving elements so that the number of the thin-film transistors to be mounted to the driving circuits can be reduced. Thereby, the productivity and the reliability of the scanning line driving element and the signal line driving element can be improved. In addition, the signals transmitted in a display period or within a display period can be reduced. Therefore, the current consumption is reduced and the drop in the power supply voltage is reduced.

Further, when the size of the element is reduced, the length of the used wiring is shortened so that the power supply voltage effect within the elements can be suppressed.

Furthermore, by selecting the side of the element substrate for arranging the input terminals and the output terminals of the driving circuit, the productivity can be improved.

DESCRIPTION OF THE PREFERRED EMBODIMENTS

Next, embodiments of the present invention will be described by referring to accompanying drawings.

Figure 3:
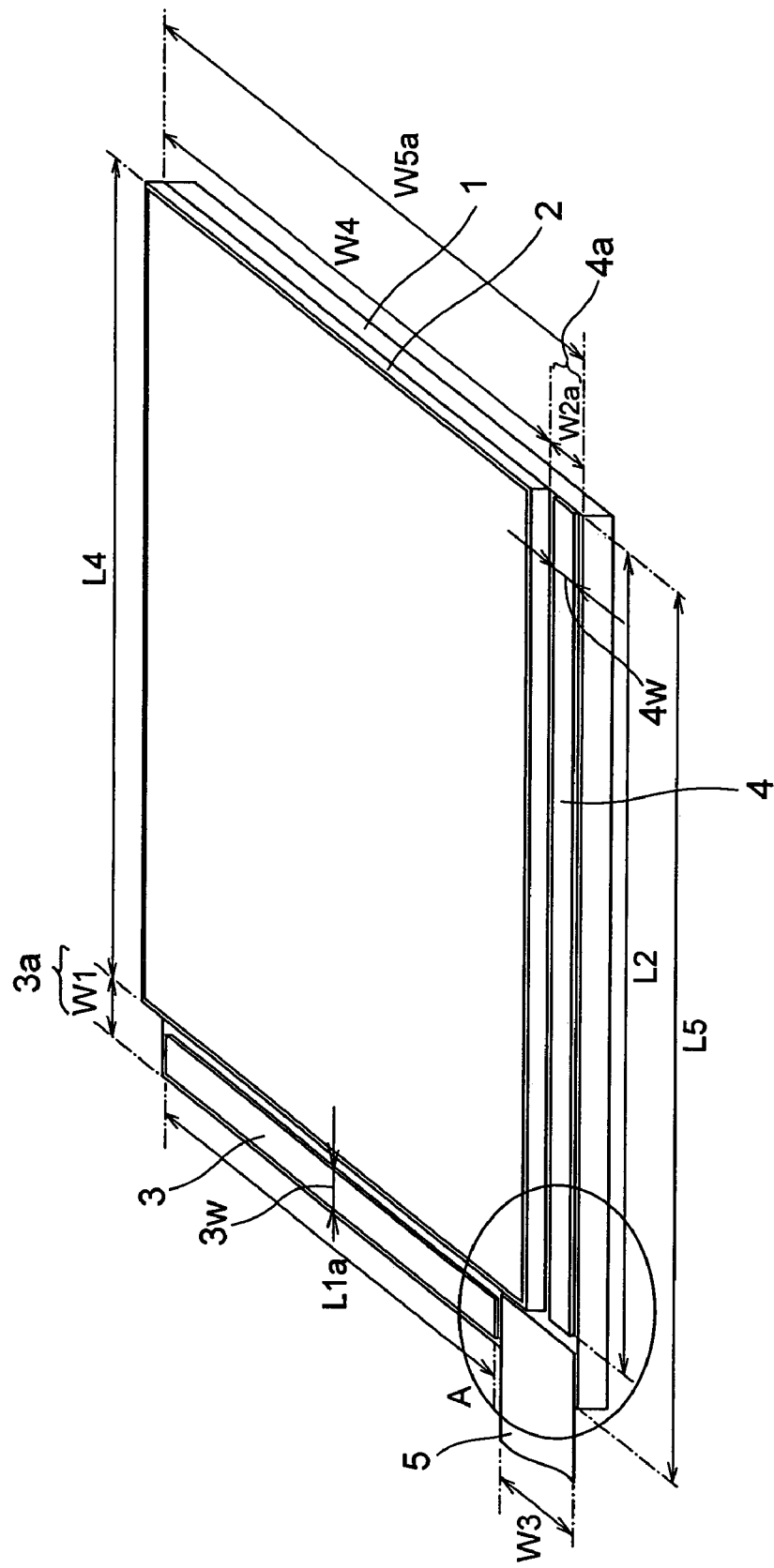
FIG. 3 is a perspective view for showing a first embodiment of a liquid crystal display device of the present invention.
Figure 4:
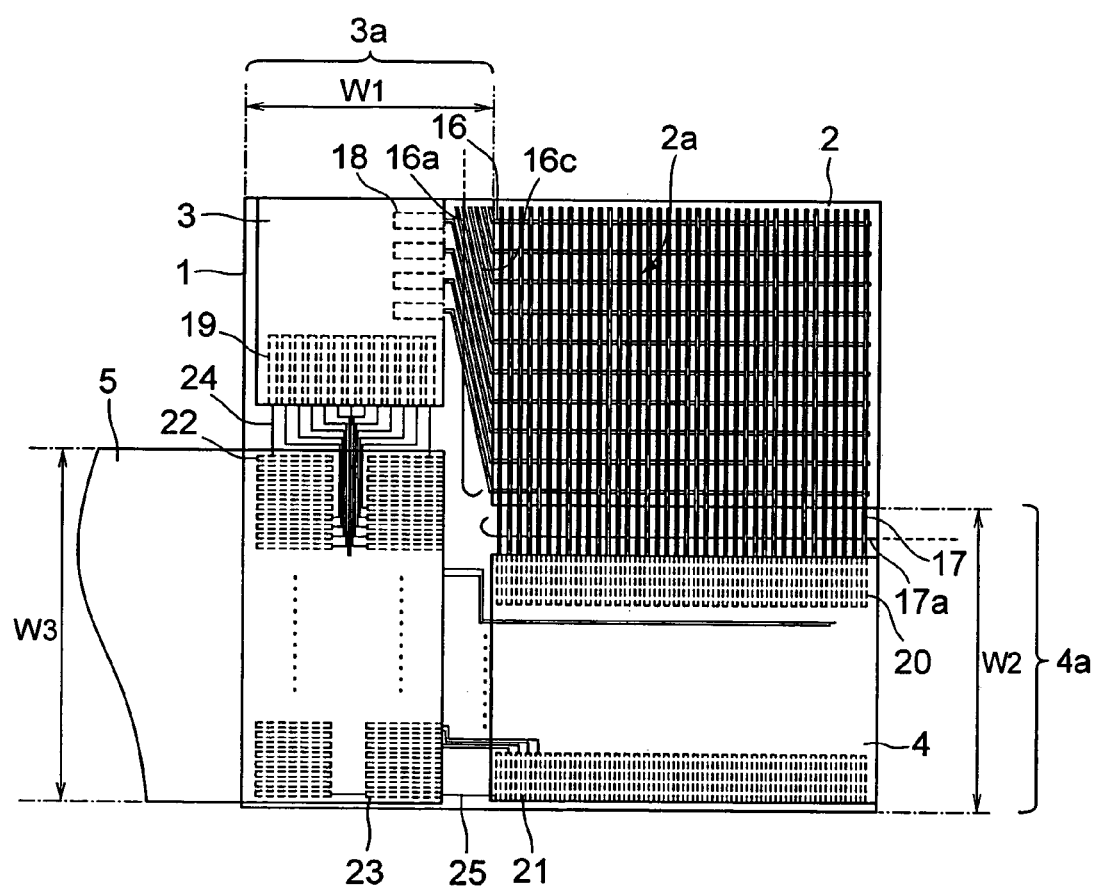
FIG. 4 is a plan view for showing the main part of the first embodiment of the liquid crystal display device of the present invention.
Figure 5:
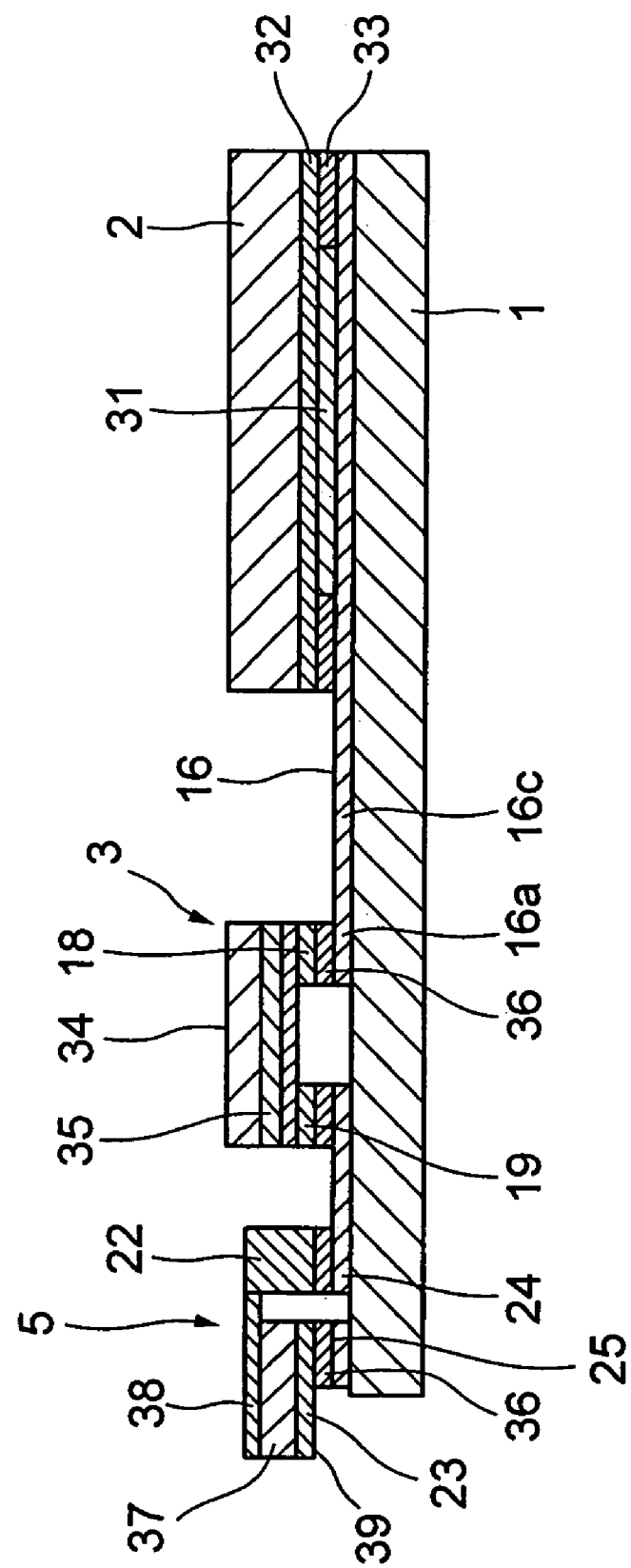
FIG. 5 is a cross section for showing the first embodiment of the liquid crystal display device of the present invention.

As shown in FIG. 3, the liquid crystal display device according to a first embodiment of the present invention comprises a glass substrate 1, a glass substrate 2, a scanning line driving element 3, a signal line driving element 4, an FPC cable 5, and the like. As shown in FIG. 4, a plurality of scanning lines 16 are arranged in parallel on the glass substrate 1 and a plurality of signal lines 17 crossing with the scanning lines 16 are arranged in parallel. Display pixels (not shown) are formed at each intersection point of the scanning lines 16 and the signal lines 17 and a display pixel region 2a is formed with a plurality of the display pixels being arranged in matrix. The display pixel of the glass substrate 1 comprises a display pixel electrode, a thin-film transistor for applying a voltage to the display pixel electrode, etc. As shown in FIG. 5, the glass substrate 2 is disposed by opposing to the glass substrate 1 with a liquid crystal layer 31 in between, in which counter electrodes 32 making pairs with the pixel electrodes of the glass substrate 1 are formed.

As shown in FIG. 3 and FIG. 4, the glass substrate 1 has a wider area than the glass substrate 2 and comprises a scanning line electrode array 16a and a signal line electrode array 17a in the edges of two sides which are projected from the outer edge of the glass substrate 2. Further, the glass substrate 1 comprises long rectangular frame parts 3a, 4a in the edges of the two sides projected from the outer edge of the glass substrate 2 along the scanning line electrode array 16a and the signal line electrode array 17a. The scanning line driving element 3 is mounted onto the frame part 3a along the scanning line electrode array 16a and the signal line driving element 4 is mounted onto the frame part 4a along the signal line electrode array 17a. The scanning line electrode array 16a is formed with a plurality of electrodes connected to a plurality of the scanning lines 16, and a plurality of the electrodes are arranged in the length direction (the vertical direction in FIG. 4) of the frame part 3a. As shown in FIG. 4 and FIG. 5, the individual electrode in the scanning line electrode array 16a is connected to the respective scanning line 16 through link lines 16c. The signal line electrode array 17a is formed with a plurality of electrodes connected to a plurality of the signal lines 17, and a plurality of the electrodes are arranged in the length direction (the horizontal direction in FIG. 4) of the frame part 4a. As shown in FIG. 4, the individual electrode in the signal line electrode array 17a is connected to the respective signal line 17.

As shown in FIG. 5, in the scanning line driving element 3, a scanning line driving circuit 35 for electrically and respectively selecting a plurality of the scanning lines 16 is formed on a glass substrate 34. In the signal line driving element 4, a signal line driving circuit for supplying video signals to a plurality of signal lines 17 is formed on a glass substrate (not shown). The driving circuits provided to each of the driving elements 3, 4 are formed by using polycrystalline silicon thin-film transistors. As shown in FIG. 4, a plurality of output terminals 18 provided to the scanning line driving circuit 35 are provided in a longer side (in the length direction) of the long rectangular glass substrate 34 by the pitch of the electrodes in the scanning line electrode array 16a. As shown in FIG. 5, each of these output terminals 18 is connected to the respective electrode of the scanning line electrode array 16a through an anisotropic conductive film 36 when the scanning line driving element 3 is mounted onto the frame part 3a. Further, in the glass substrate 34, thirteen (four power sources, eight control signals, one clock) input terminals 19 of the scanning line driving circuit 35 are formed in the sorter side which is adjacent to the FPC cable 5.

Similarly, the signal line driving element 4 comprises a signal line driving circuit provided on the glass substrate. The signal line driving circuit is formed with polycrystalline silicon thin-film transistors and supplies the video signals and voltages to the signal lines 17. A plurality of output terminals 20 of the signal line driving circuit are disposed along the length direction of the glass substrate. A plurality of the output terminals 20 are respectively connected to the electrodes of the signal line electrode array 17a. A plurality of input terminals 21 of the signal line driving circuit are disposed along the length direction of the glass substrate in another side which opposes the side where the output terminals 20 are provided.

The glass substrate is used herein for the substrate 1, however, it is not limited to this. As the substrates for the driving elements 3, 4, it is possible to use a substrate having the similar thermal expansion coefficient to that of the substrate 1. As the substrates of the driving elements 3, 4 and the substrate 1, it is possible to use either a glass substrate or a plastic substrate.

Further, the embodiment uses a flexible flat cable (referred to as FPC cable hereinafter) 5. As shown in FIG. 5, the FPC cable 5 comprises a plurality of copper wires 38, 39 formed parallel respectively on both faces of a flat film substrate 37, and connecting terminals 22, 23 in the end portions of the wirings 38, 39. The wiring 38 provided to one face of the film substrate 37 is for supplying the signals and the power to the driving circuit 35 of the scanning line driving element 3, while the wiring 39 provided to another face is for supplying the signals and the power to the driving circuit of the signal line driving element 4. The terminals 22 of the wiring 38 are connected to wirings 24 of the glass substrate 1 through the anisotropic conductive film 36 and the wirings 24 are connected to the input terminals 19 of the scanning line driving circuit 35 through the anisotropic conductive film 36. The terminals 23 of the wiring 39 are connected to wirings 25 of the glass substrate 1 through the anisotropic conductive film 36 and the wirings 25 are connected to the input terminals 21 of the signal line driving circuit through the anisotropic conductive film. The wirings 24, 25 are formed of a material such as aluminum, copper, or the like.

Further, the relations between the frame parts 3a, 4a, the scanning line driving element 3, and the signal line driving element 4 of the glass substrate 1 in the embodiment will be described. In the embodiment, the FPC cable 5 is mounted to a corner of the glass substrate 1 between the two sides of the frame parts 3a and 4a.

Figure 1:
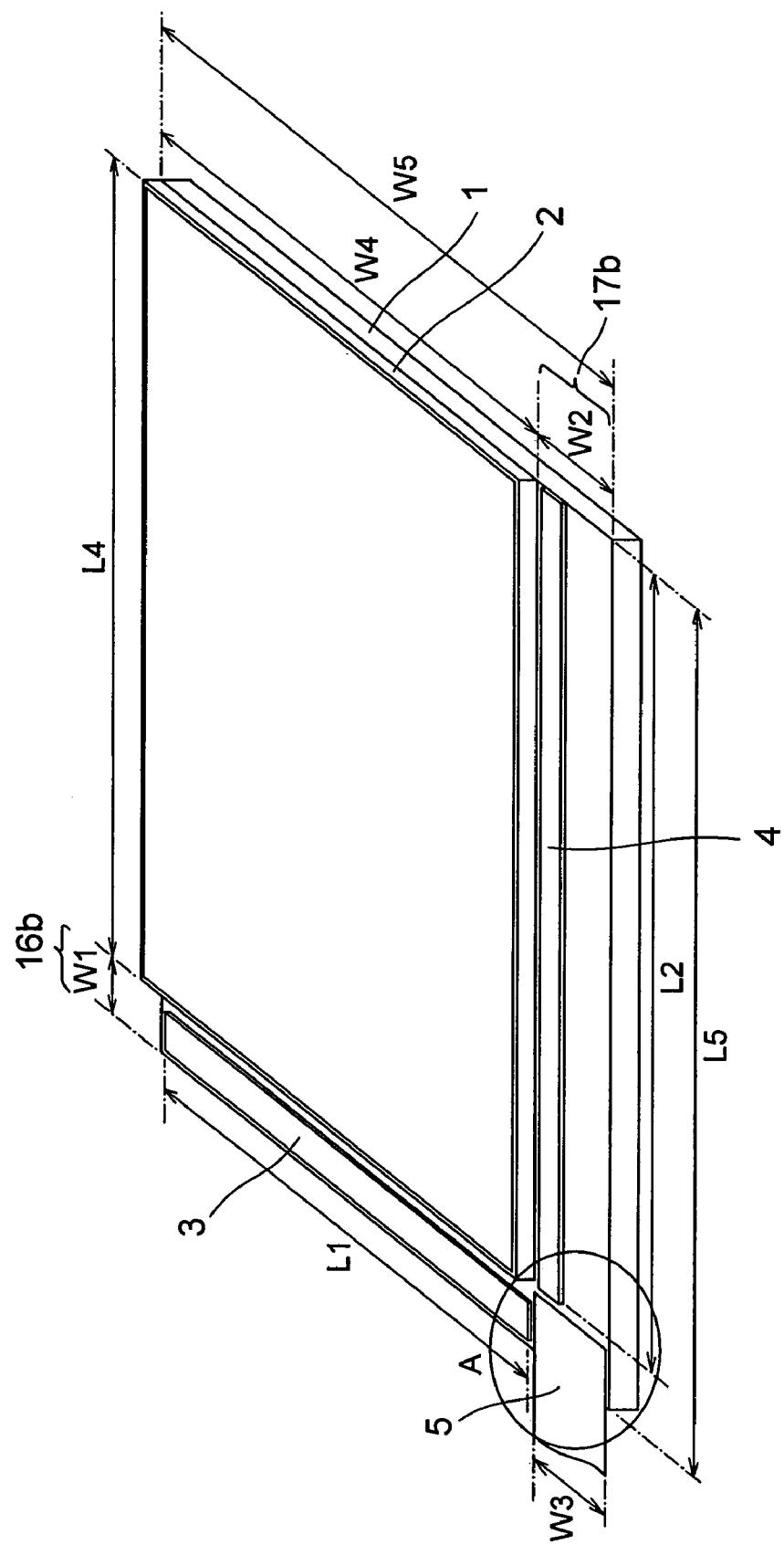
FIG. 1 is a perspective view for showing a conventional case.
Figure 2:
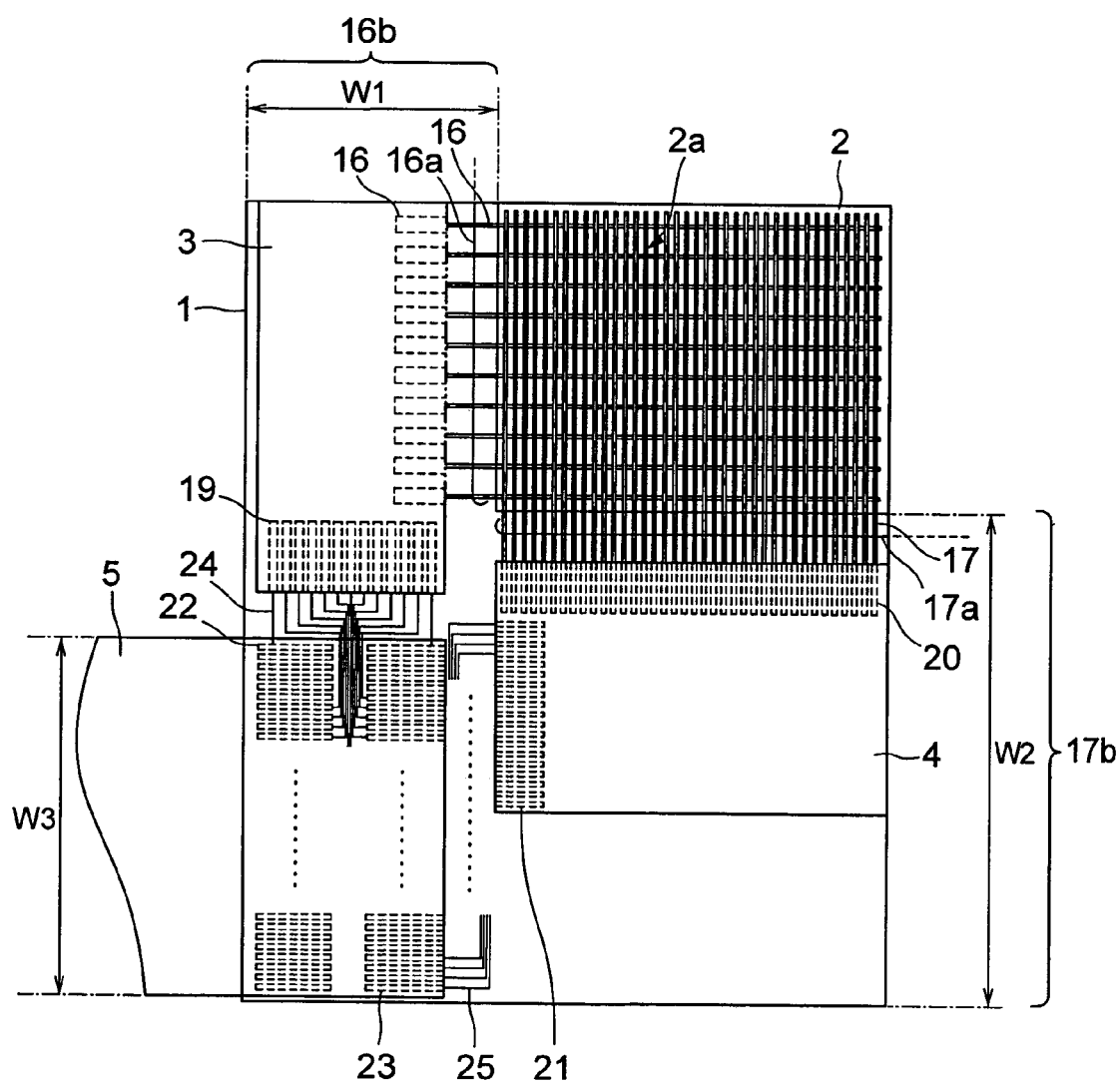
FIG. 2 is a plan view for showing the main part of the conventional case.

In the embodiment, a width W2a (the width in the vertical direction of FIG. 4) of the frame part 4a to which the signal line driving element 4 is mounted is set approximate to a width 3W (the width in the vertical direction of FIG. 4) of the signal line driving element 4. Thereby, a required space for mounting the signal line driving element 4, the signal line electrode array 17a and the like can be kept in the frame part 4a of the glass substrate 1 and, unlike the conventional case, an unnecessary space which does not contribute to mounting the elements can be eliminated. Similarly, a width W1 (the width in the horizontal direction of FIG. 4) of the frame part 3a to which the scanning line driving element 3 is mounted is set approximate to the width 3W (the width in the horizontal direction of FIG. 4) of the scanning line driving element 3. Thereby, a required space for mounting the scanning line driving element 3, the scanning line electrode array 16a and the like can be kept in the frame part 3a of the glass substrate 1 and, unlike the conventional case, an unnecessary space which does not contribute to mounting the elements can be eliminated. The dimensional relation between the embodiment shown in FIG. 3 and the conventional case shown in FIG. 1 are as follows; Width W2a of the frame part 4a (FIG. 3)<Width of the frame part 4a (FIG. 1), and Width W5a of the glass substrate 1 (FIG. 3)<Width W5 of the glass substrate (FIG. 1).

Further, the FPC cable 5 is mounted in the corner of the glass substrate 1 between the two sides of the frame parts 3a, 4a by defining a length L1a of the scanning line driving element 3 as shown in FIG. 3. The detailed description will be provided hereinafter. The width W3 (the width in the vertical direction of FIG. 4) of the FPC cable 5 is wider than the width W1 of the frame part 3a and the width W2 of the frame part 4a of the conventional case shown in FIG. 1. Thus, a length L2 of the signal line driving element 4 is set to be approximate to a length L4 (the length in the horizontal direction of FIG. 3) of the glass substrate 2. The length L4 is approximate to the length which is obtained by subtracting the width W1 of the frame part 3a from a length L5 (the length in the horizontal direction of FIG. 3) of the glass substrate 1. Further, the length L1a of the scanning line driving element 3 is set shorter than the length of the frame part 3a. Specifically, the length L1a of the scanning line driving element 3 is set to be approximate to the length which is obtained by subtracting the width W3 (the width in the vertical direction of FIG. 3) of the FPC cable 5 from the width W5a which is the sum of the width (width in the vertical direction of FIG. 3) W4 of the glass substrate 2 and the width W2a of the frame part 4a. Therefore, the dimensional relations are as follows; Length L1a of scanning line driving element 3 (FIG. 3)<Length L1 of scanning line driving element 3 (FIG. 1), and Length L2 of signal line driving element (FIG. 3)=Length L2 of signal line driving element 4 (FIG. 1).

By setting the lengths in the manner as described above, the scanning line driving element 3 and the signal line driving element 4 are mounted to the frame parts 3a and 4a. The signal line driving element 4 is mounted within the frame part 4a having the width W2a and the length L4. If the scanning line driving element 3 is mounted within the frame part 3a having the width W1 and the length (W4), a vacant space is kept in the corner of the glass substrate 1 between the two sides of the frame parts 3a and 4a since the length L1a is shorter than the length (W4). Thus, as shown in FIG. 3, the FPC cable 5 is mounted to the vacant space of the frame part 3a alongside of the scanning line driving element 3. In this case, the total length as the sum of the length L1a of the scanning line driving element 3 and the width W3 of the FPC cable 5 becomes approximate to the width W5a of the glass substrate 1. Therefore, the scanning line driving element 3 and the FPC cable 5 can be disposed alongside of each other so that the width of the frame part 4a can be suppressed to be the width W2a.

It will be described in more detail in the followings. For example, in the case of 12.1-inch XGA (1024×768) color liquid crystal panel, formed on the surface of the glass substrate 1 are 2,359,296 thin-film transistors for applying the voltages to the display pixel electrodes, 768 scanning lines 16 for electrically selecting the thin-film transistors, and 3,072 signal lines 17 which are orthogonal to the scanning lines 16. On the surface of the glass substrate 2, the counter electrodes 32 which make the pairs with the display pixel electrodes of the glass substrate 1 are formed. Further, the glass substrate 1 and the glass substrate 2 are laminated to each other for sealing in the liquid crystal layer 31. As shown in FIG. 4, along the length direction of the frame part 3a of the glass substrate 1, provided is the scanning line electrode array 16a in which the 768 electrodes are arranged by 240 μm pitch. The pitch of the electrodes of the scanning line electrode array 16a is set to be the same as the pitch of the output terminals 19 of the driving circuit 35 of the shortened scanning line driving element 3, so that it becomes narrower than the pitch of the scanning lines 16. As shown in FIG. 4, along the length direction of the frame part 4a of the glass substrate 1, provided is the signal line electrode array 17a in which 3,072 electrodes are arranged by 80 μm pitch. The pitch of the electrodes of the signal line electrode array 17a is set to be the same as the pitch of the output terminals 20 of the driving circuit of the signal line driving element 4.

Therefore, when the scanning line driving element 3 is mounted onto the frame part 3a, the output terminals 19 of the driving circuit 35 are individually connected to the electrodes of the scanning line electrode array 16a. Further, on the glass substrate 34 of the scanning line driving element 3, thirteen (four power sources, eight control signals, one clock) input terminals 19 of the scanning line driving circuit 35 are formed in the shorter side which is adjacent to the FPC cable 5. The width of the scanning line driving element 3 is 4 mm so that a plurality of the input terminals 19 are disposed by 300 μm pitch.

As shown in FIG. 4, on the glass substrate of the signal line driving element 4, forty (three power sources, eight control signals, one clock, eighteen video signals, ten gradation signals) input terminals 21 of the signal line driving circuit are formed. If the pitch of the input terminals 21 is 80 μm, the length of the lined input terminals 21 becomes 3.2 mm. These input terminals 19 and 21 are electrically connected to the connecting terminals 22, 23 of the FPC cable 5 through the wirings 24, 25.

On the glass substrates of the scanning line driving element 3 and the signal line driving element 4, it is necessary to provide the wirings for supplying the power sources and the like to the four-system power sources and the GND, the eighteen video signals, the ten gradation signals, the sixteen control signals, the two clock signals, and the counter electrodes for the display pixel electrodes of the liquid crystal display panel. Provided that an FPC cable in the length of 10 cm having the copper wirings 38, 39 (wiring width=40 μm, wiring pitch=80 μm, wiring thickness=9 μm) on both faces of the film substrate 37 is used as the FPC cable and an electric current of 50 mA is flown to the four-system power sources and the counter electrode power sources, the specific resistance of the copper wiring becomes $1.7 \times 10^{-8}$ [Ω·m] for suppressing the voltage drop in the FPC cable 5 to be 0.02 V or less. Thus, twelve wirings or more are required for each power source. Similarly, if an electric current of 100 mA is flown to the GND, twenty-four wirings or more are required for the GND so as to suppress the voltage drop in the FPC cable 5 to be 0.02 V or less. Accordingly, there are one-hundred and thirty copper wirings or more in total for the FPC cable 5 and sixty-five wirings or more on one face, so that the width W3 of the FPC cable 5 becomes 5.2 mm or more.

At this time, the length L1a of the glass substrate 34 of the scanning line driving element 3 is substantially the same as the length which is obtained by subtracting the width W3 (5.2 mm) of the FPC cable 5 from the length W5 which is the sum of the width W4 (184.3 mm) of the glass substrate 2 and the width W2a ((4+α) mm) of the frame part 4a to which the signal line driving element 4 is mounted. That is, it can be expressed as L1≈W4+W2−W3, so that the length L1a of the glass substrate 34 of the scanning line driving element 3 becomes (183.1+α) mm.

Therefore, it enables to achieve an effect that the FPC cable 5 can be connected without widening the width W2 of the frame part 4a.

Further, as shown in FIG. 4, each electrode of the scanning line electrode array 16a to be connected to the output terminals 18 of the scanning line driving element 3 is connected to the respective scanning line 16 through the link line 16c. The pitch of the electrodes in the scanning line electrode array 16a is set to be the same as the pitch of the output terminals 19 of the driving circuit 35 of the shortened scanning line driving element 3, so that it is narrower than the pitch of the scanning lines 16. Thus, as for the lengths of the link lines 16c, it becomes gradually shorter as going farther away from the input terminals 19. Therefore, it is possible to suppress the difference in the transmission time of the driving signals reaching from the output terminals 19 to the scanning lines 16 as little as possible irrespective of the positions of the output terminals 18 with respect to the input terminals 19.

For example, provided that the size of the liquid crystal display panel is 12 inches and the width W4 of the glass substrate 2 is 183 mm, the width W2 of the frame part 4a to which the signal line driving element 4 is mounted is 4 mm, the width W3 of the FPC cable 5 is 5.2 mm, the chrome wiring with the sheet resistance of 1.2 Ω/□ is used for the wirings of the scanning lines 16, the load capacity of the scanning line 16 is 220 pF, the length of the input terminal 19 of the driving circuit 35 provided to the scanning line driving element 3 is 1.5 mm, and the distance between the FPC cable 5 and the scanning line driving element 3 is 1 mm, the length of the link line 16c between the output terminal 18 close to the input terminal 19 and the scanning line 16 becomes approximately 3.7 mm. At this time, the difference between the delay time of the signals outputted from the output terminal 18 close to the input terminal 19 of the scanning line driving element 3 and the delay time of the signals outputted from the output terminal 18 far from the input terminal 19 of the scanning line driving element 3 becomes 50 ns.

If the width of the link line 16c between the scanning line 16 and the output terminal 18 close to the input terminal 19 of the driving circuit 35 provided to the scanning line driving element 3 is 20 μm, the delay time due to the link line 16c becomes 1.2 Ω/□×3.7 mm/20 μm×220 pF≈50 ns. Therefore, the difference between the delay time of the signals outputted from the output terminal 18 close to the input terminal 19 of the scanning line driving element 3 and the delay time of the signals outputted from the output terminal 18 far from the input terminal 19 can be corrected to be approximately 50 ns.

In the above-described embodiment, the delay time of the signals is corrected by changing only the lengths of the link lines 16c between the output terminals 18 and the scanning lines 16 of the scanning line diving element 3. However, it is not limited to this. The delay time of the signals may be corrected by changing the widths of the wirings in addition to changing the lengths of the wirings.

Further, the embodiment has a configuration in which the input terminals 21 of the signal line driving element 4 are arranged in the side which opposes to the side where the output terminals 20 are arranged. Thus, there is only one direction (that is, the direction of the length L2 of the signal line driving element 4), which requires the precise positioning of the signal line driving element 4. Therefore, the productivity and the reliability can be improved.

Figure 6:
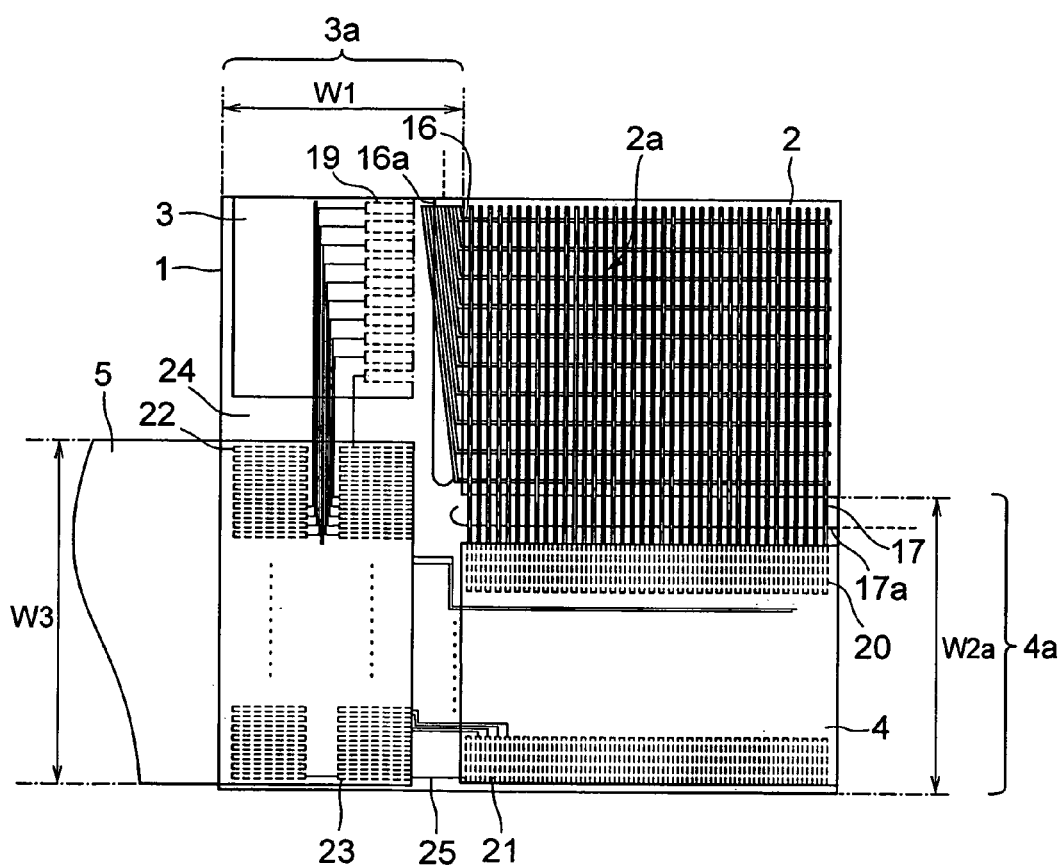
FIG. 6 is a plan view for showing the main part of a second embodiment of the liquid crystal display device of the present invention.

In the first embodiment, it is possible to have a configuration in which the input terminals 19 of the scanning line driving element 3 are arranged in the side where the output terminals 18 are disposed. The configuration thereof is shown in FIG. 6 as a second embodiment. In the second embodiment, the input terminals 19 of the scanning line driving element 3 are arranged in the side where the output terminals 18 are disposed. Thus, there is only one direction (that is, the direction of the length L1a of the glass substrate 34), which requires the precise positioning of the scanning line driving element 3. Therefore, the productivity and the reliability can be improved. In FIG. 6, the scanning line driving output terminals 18 are provided continuously from a plurality of the input terminals 19 in the length direction (L1) of the glass substrate 34. In FIG. 6, the output terminals 18 are not illustrated.

Figure 7:
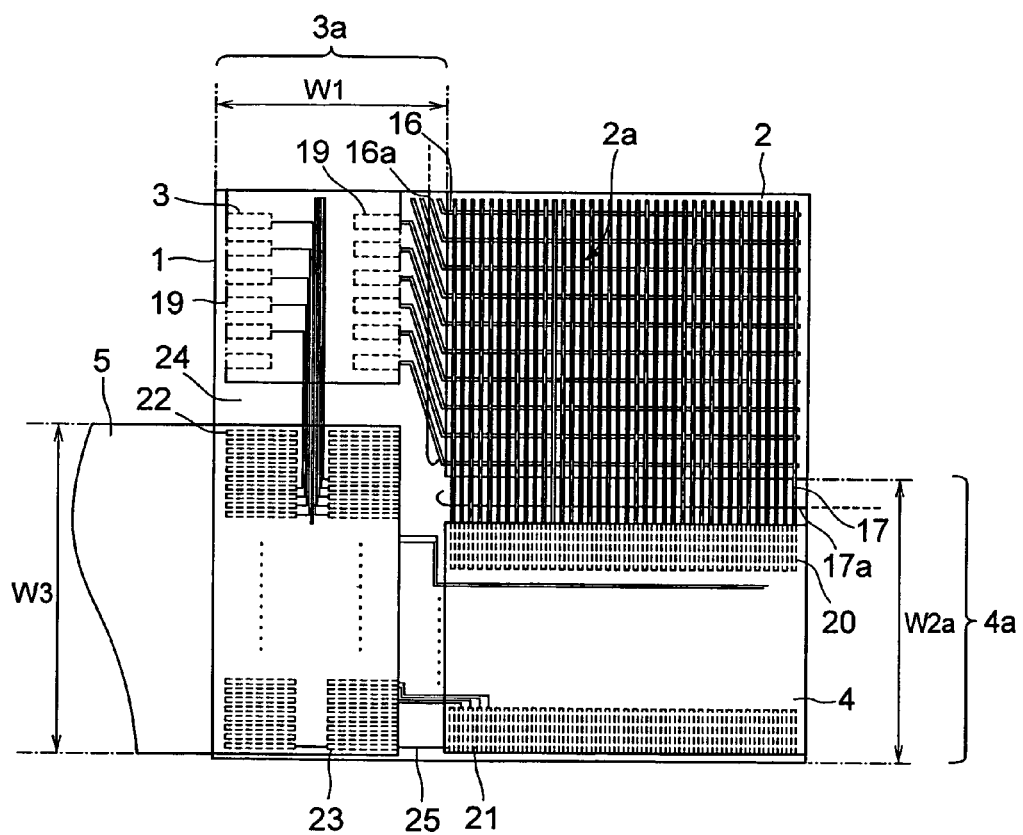
FIG. 7 is a plan view for showing the main part of a third embodiment of the liquid crystal display device of the present invention.

Further, in the first embodiment, it is possible to have a configuration in which the input terminals 19 of the scanning line driving element 3 are arranged in the side which is opposite to the side where the output terminals 18 are disposed. The configuration thereof is shown in FIG. 7 as a third embodiment. In the third embodiment, the input terminals 19 of the scanning line driving element 3 are arranged in the side which is opposite to the side where the output terminals 18 are disposed. Thus, there is only one direction (that is, the direction of the length L1 of the glass substrate 34 of the scanning line driving element 3), which requires the precise positioning of the scanning line driving element 3. Therefore, the productivity and the reliability can be improved.

In the first to third embodiments, the input terminals 21 of the signal line driving element 4 may be arranged in the side which is adjacent to the side where the output terminals 20 are disposed or may be arranged in the side where the output terminals 20 are disposed.

In the first embodiment, the length L1a of the scanning line driving element 3 is set to be almost equal to the length which is obtained by subtracting the width W3 of the FPC cable 5 for connecting to the outer circuits from the length W5a which is the sum of the width W4 of the glass substrate 2 and the width W2a of the frame part 4a to which the signal line driving element 4 is mounted. However, it is not limited to this. It is also possible to set the length L2a of the signal line driving element 4 to be almost equal to the length which is obtained by subtracting the width W3 (5.2 mm) of the FPC cable 5 from the length L5 which is the sum of the length L4 (245.7 mm, which corresponds to the length of the signal line electrode array 17a) of the glass substrate 2 and the width W1 ((4+α) mm) of the frame part 3a to which the scanning line driving element 3 is mounted. The configuration thereof will be shown in FIG. 8 as a fourth embodiment.

Figure 8:
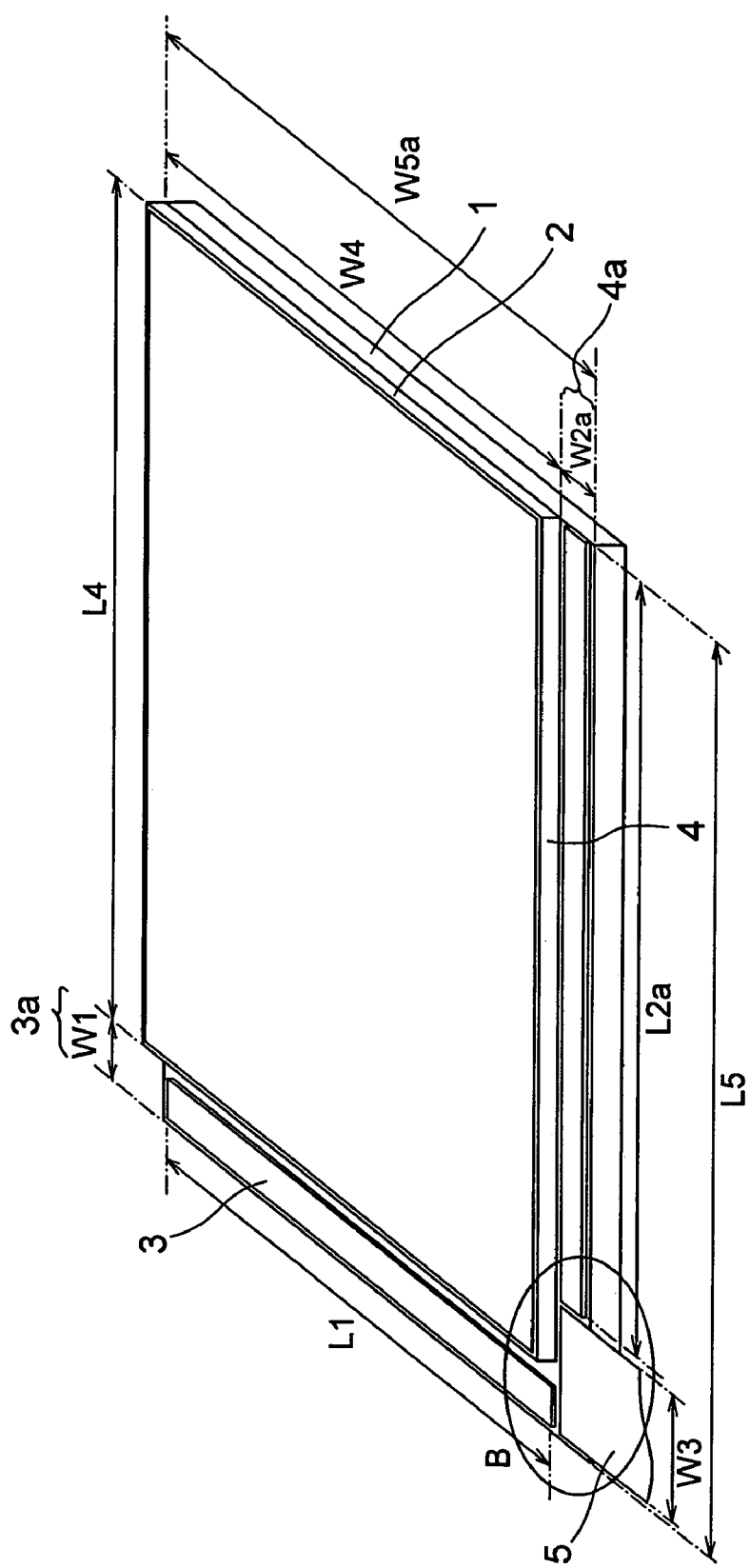
FIG. 8 is a perspective view for showing a fourth embodiment of a liquid crystal display device of the present invention.
Figure 9:
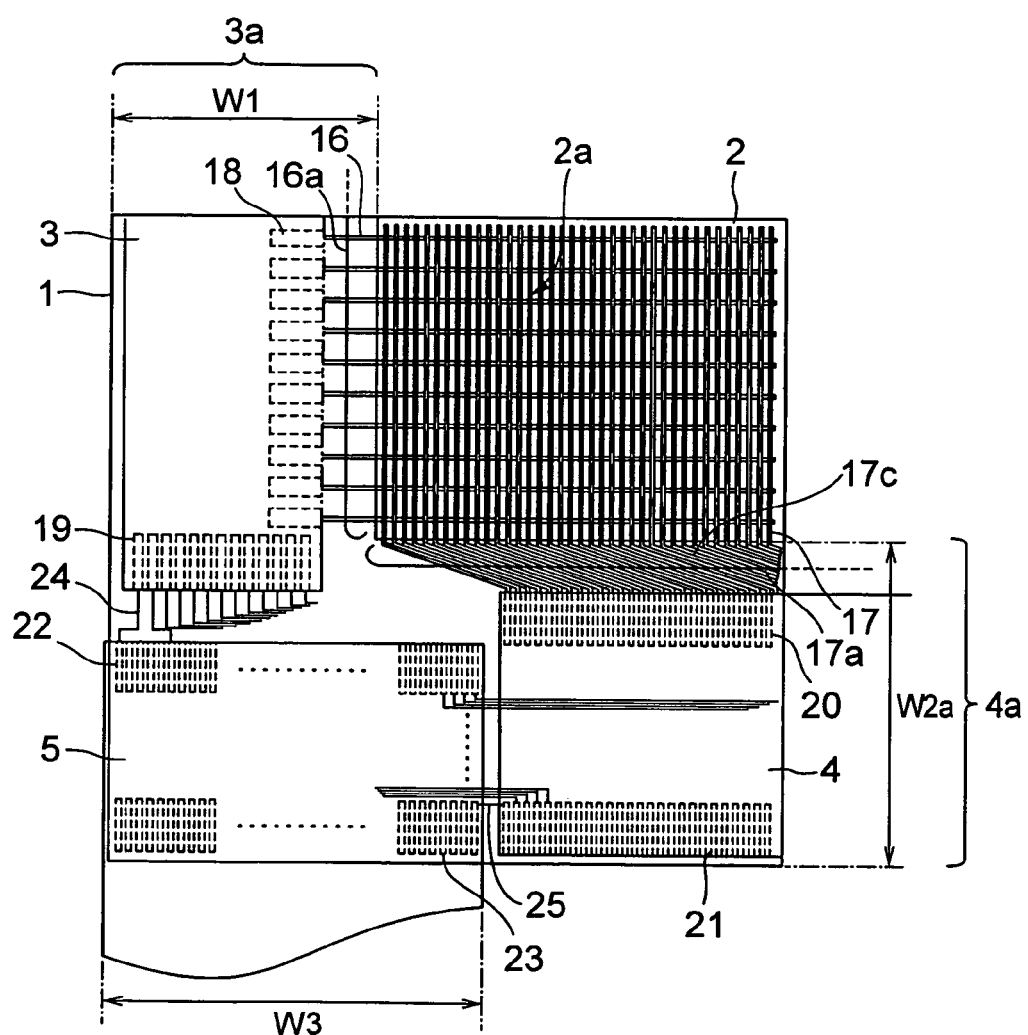
FIG. 9 is a plan view for showing the main part of the fourth embodiment of the liquid crystal display device of the present invention.

In FIG. 8, the dimensional relation is that the length L2a of the signal line driving element 4 (FIG. 8)<the length L2 of the signal line driving element 4 (FIG. 3). That is, in FIG. 8, it can be expressed as L2a=L4+W1−W3, so that the length L2a of the signal line driving element 4 becomes (244.5+α) mm. Further, FIG. 9 shows the arrangement of the input terminals 19 of the scanning line driving element 3, the arrangement of the input terminals 21 of the signal line driving element 4, and structures of the connecting terminals 22, 23 of the FPC cable 5, the wirings 24, 25 and the like for connecting the input terminals 19, 21 and the connecting terminals 22, 23 in the above-described configuration. In FIG. 9, the delay of signals is minimized by adjusting the lengths of the wirings 24, 25 for connecting the terminals 22, 23 of the FPC cable 5 and the input terminals 19, 21. Further, the length of the signal line driving element 4 is shortened so that the pitch of the output terminals 20 of the driving circuit of the signal line driving element 4 is narrowed. The electrodes of the signal line electrode array 17a are provided by the pitch according to the narrowed pitch of the output terminals 20, and each electrode of the signal line electrode array 17a is individually connected to the respective signal line 17 through the link line 17c as shown in FIG. 9. The pitch of the electrodes of the signal line electrode array 17a is set to be the same as that of the narrowed output terminals 20, so that it is narrower than the pitch of the signal lines 17. Accordingly, the link lines 17c become gradually shorter as shown in the drawing. Therefore, the difference of the transmission time of the driving signals reaching from the output terminals 20 to the signal lines 17 can be suppressed as much as possible, irrespective of the positions of the output terminals 20.

In the fourth embodiment, the input terminals 19 of the scanning line driving element 3 may be arranged in the side which is opposite to the side where the output terminals 20 are disposed or may be arranged in the side where the output terminals 18 are disposed. Also, the input terminals 21 of the signal line driving element 4 may be arranged in the side which abuts against the side where the output terminals 20 are disposed or may be arranged in the side where the output terminals 20 are disposed.

In the first embodiment, the FPC cable 5 is provided in the corner of the glass substrate 1 between the frame part 3a to which the scanning line driving element 3 is mounted and the frame part 4a to which the signal line driving element 4 is mounted. Instead, the configuration shown in FIG. 10 and FIG. 11 may be employed. In this embodiment, the scanning line driving element 3 with the shortened length L1a is shifted towards the corner C1 side of the substrate 1 between the two frame parts 3a, 4a and the scanning line driving element 3 is mounted over the corner C1 and the frame part 3a for keeping a space in an opposite side corner C2. And, the FPC cable 5 is mounted in the space of the corner C2. Accordingly, in the embodiment illustrated by FIG. 10 and FIG. 11, the dimensional relation can be expressed as L1a=W4+W2a−W3, where, the length of the scanning line driving element 3 is L1a, the width of the frame part 4a is W2a, and the width of the FPC cable 5 is W3.

Figure 11:
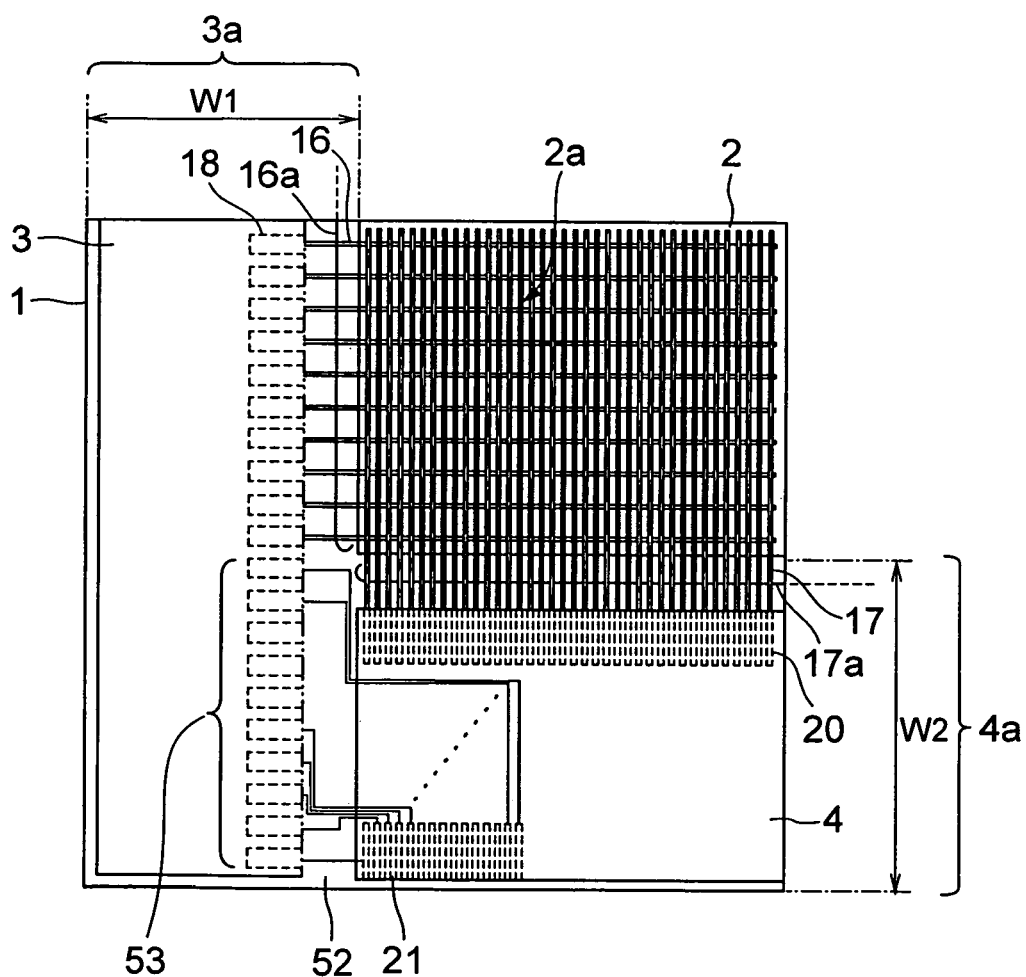
FIG. 11 is a plan view for showing the main part of the fifth embodiment of the liquid crystal display device of the present invention.

Although not shown in the drawing, the wirings (25) for connecting the input terminals 21 of the signal line driving element 4 and the connecting terminals 23 of the FPC cable 5 are formed on the glass substrate 34 of the scanning line driving element 3. Further, as shown in FIG. 11, a plurality of junction terminals 53 connected to a plurality of the wirings (25) are provided being lined along the length direction of the glass substrate 34. Also, wirings 52 are formed in the corner of the glass substrate 1, and the wirings 52 connect the terminals 53 and the input terminals 21 of the signal line driving element 4. The wirings 52 are made of a material such as aluminum, chrome, copper or the like.

Figure 10:
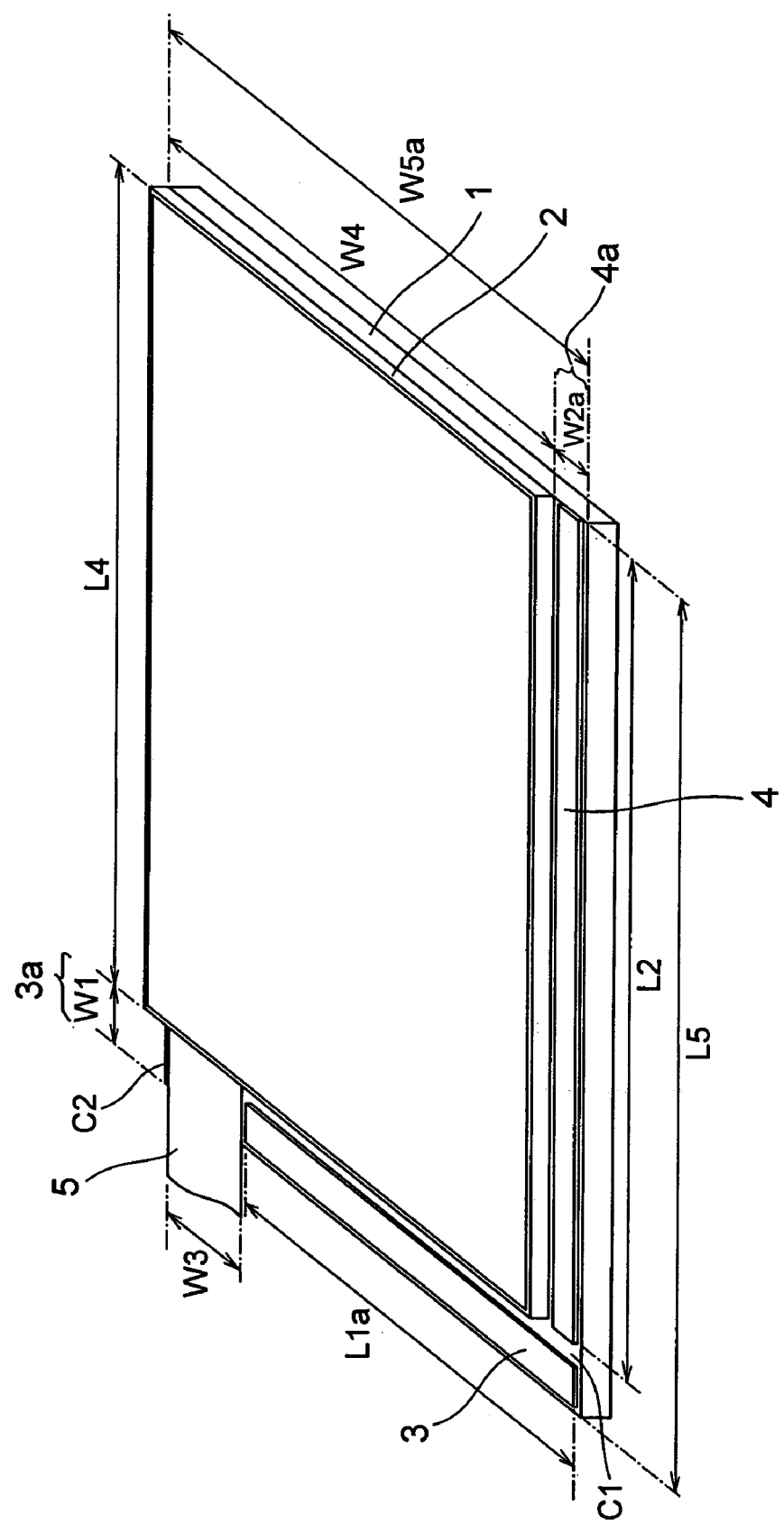
FIG. 10 is a perspective view for showing a fifth embodiment of a liquid crystal display device of the present invention.
Figure 12:
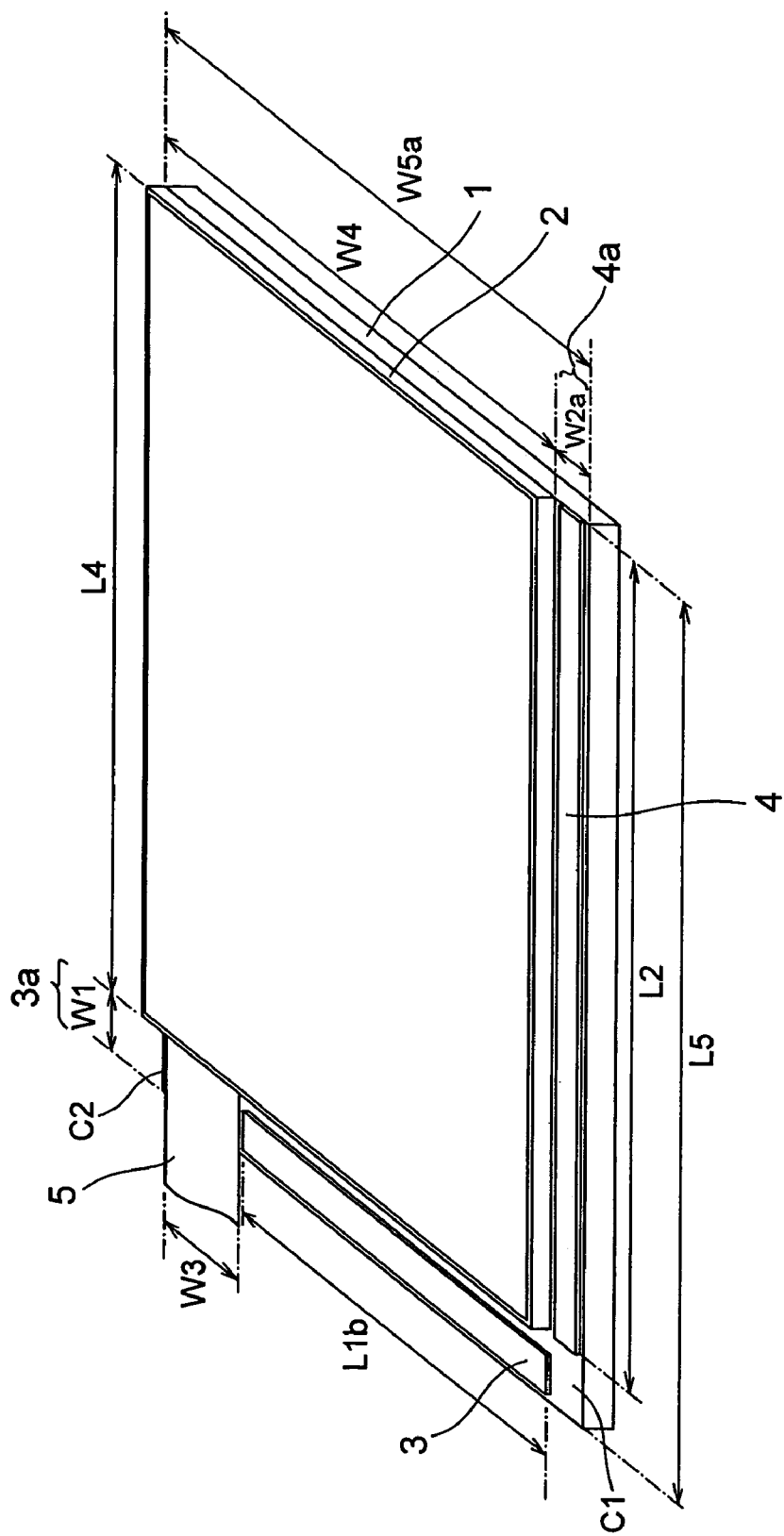
FIG. 12 is a perspective view for showing the fifth embodiment of a liquid crystal display device of the present invention.
Figure 13:
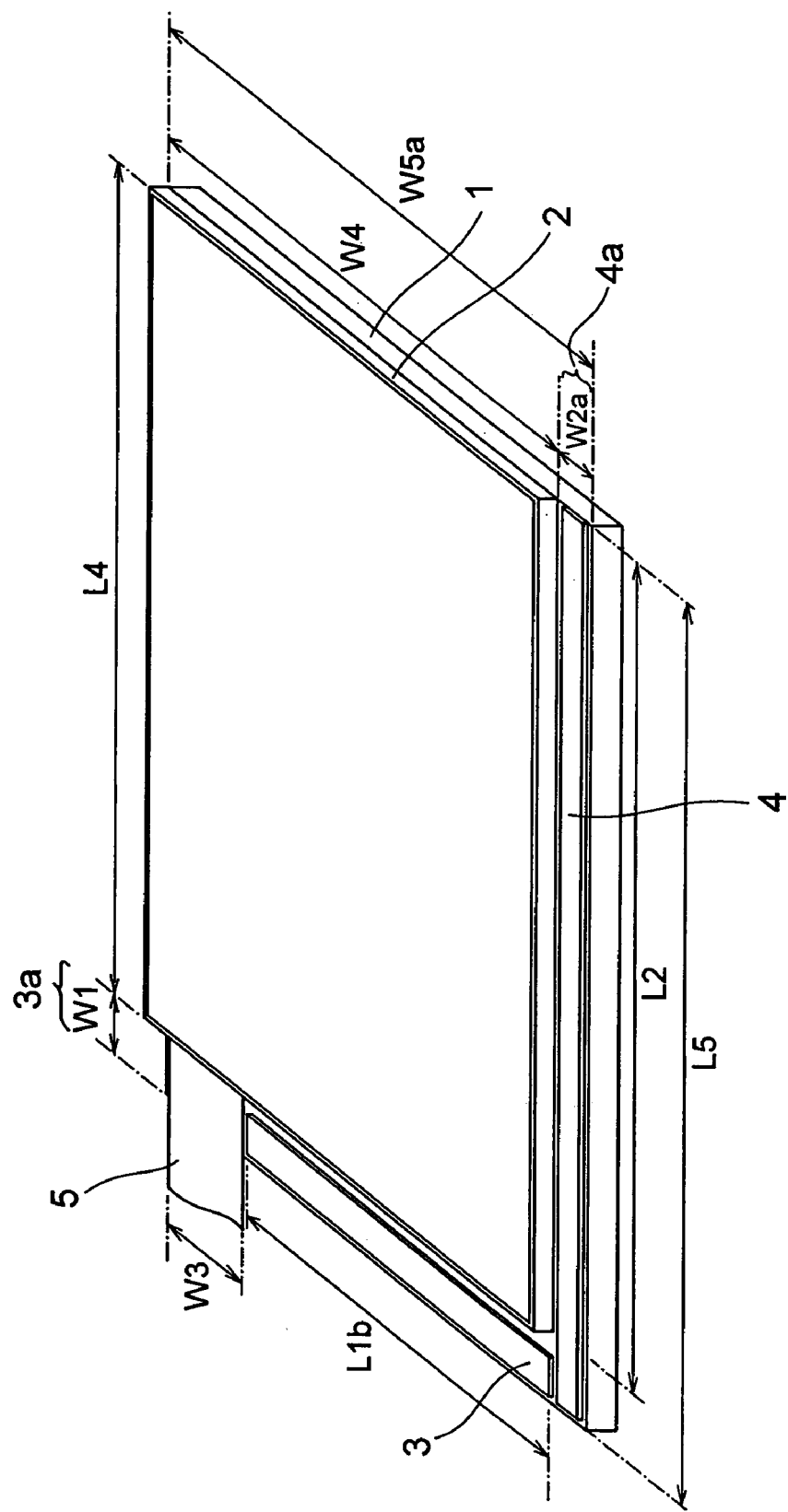
FIG. 13 is a perspective view for showing the fifth embodiment of a liquid crystal display device of the present invention.

The embodiment shown in FIG. 10 and FIG. 11 is the case where there is a dimensional relation expressed as L1a=W4+W2a−W3. However, the configuration illustrated in FIG. 12 and FIG. 13 may be employed as well. In the embodiment shown in FIG. 12 and FIG. 13, the length L1b of the scanning line driving element 3 is set to be (W4−W3). A space is kept in the corner C2 for mounting the FPC cable 5.

In the case where the FPC cable 5 is mounted using the corners C1, C2 of the substrate 1 as described above, the FPC cable 5 can be mounted onto the substrate 1 by selecting the corner which requires only the short length of the FPC cable 5. In general, the price of the FPC cable 5 increases in proportion to the length, so that the cost for the FPC cable 5 can be suppressed by shortening the FPC cable 5.

Figure 14:
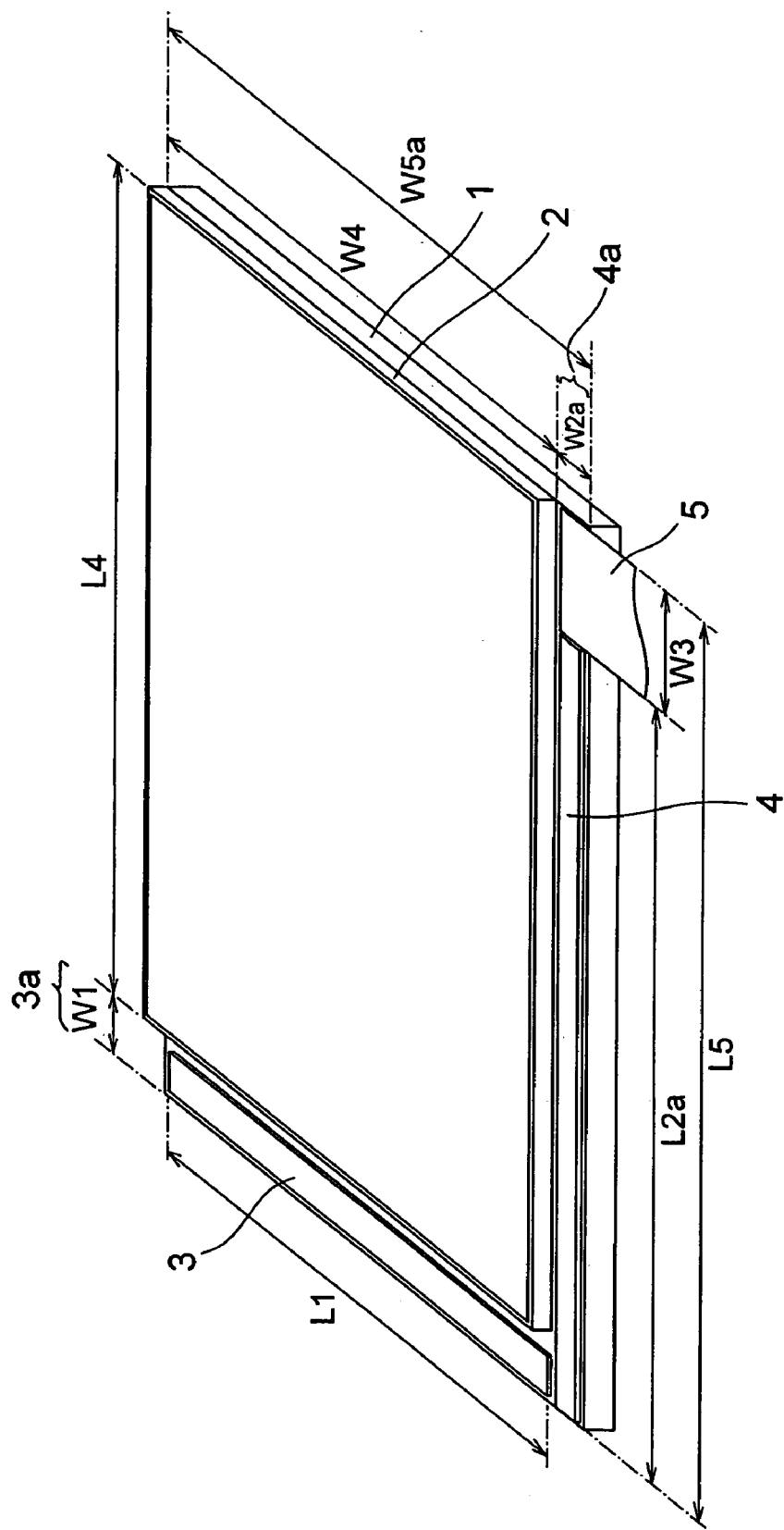
FIG. 14 is a perspective view for showing a sixth embodiment of a liquid crystal display device of the present invention.

In the first embodiment, the FPC cable 5 is provided in the corner of the glass substrate 1 between the frame part 3a to which the scanning line driving element 3 is mounted and the frame part 4a to which the signal line driving element 4 is mounted. However, it is not limited to this. In an embodiment shown in FIG. 14, the length of the signal line driving element 4 is shortened and the shortened length L2a is set to be the length which is obtained by subtracting the width W3 of the FPC cable 5 from the length L5 of the substrate 1. The shortened signal line driving element 4 is shifted towards the corner side of the substrate 1 between the two frame parts 3a, 4a so as to keep the space in the frame part 4a. The FPC cable 5 is mounted onto the space. Although not shown in the drawing, the wirings for connecting the input terminals 19 of the scanning line driving element 3 and the connecting terminals 22 of the FPC cable 5 are formed on the glass substrate of the signal line driving element 4 and the substrate 1.

Figure 15:
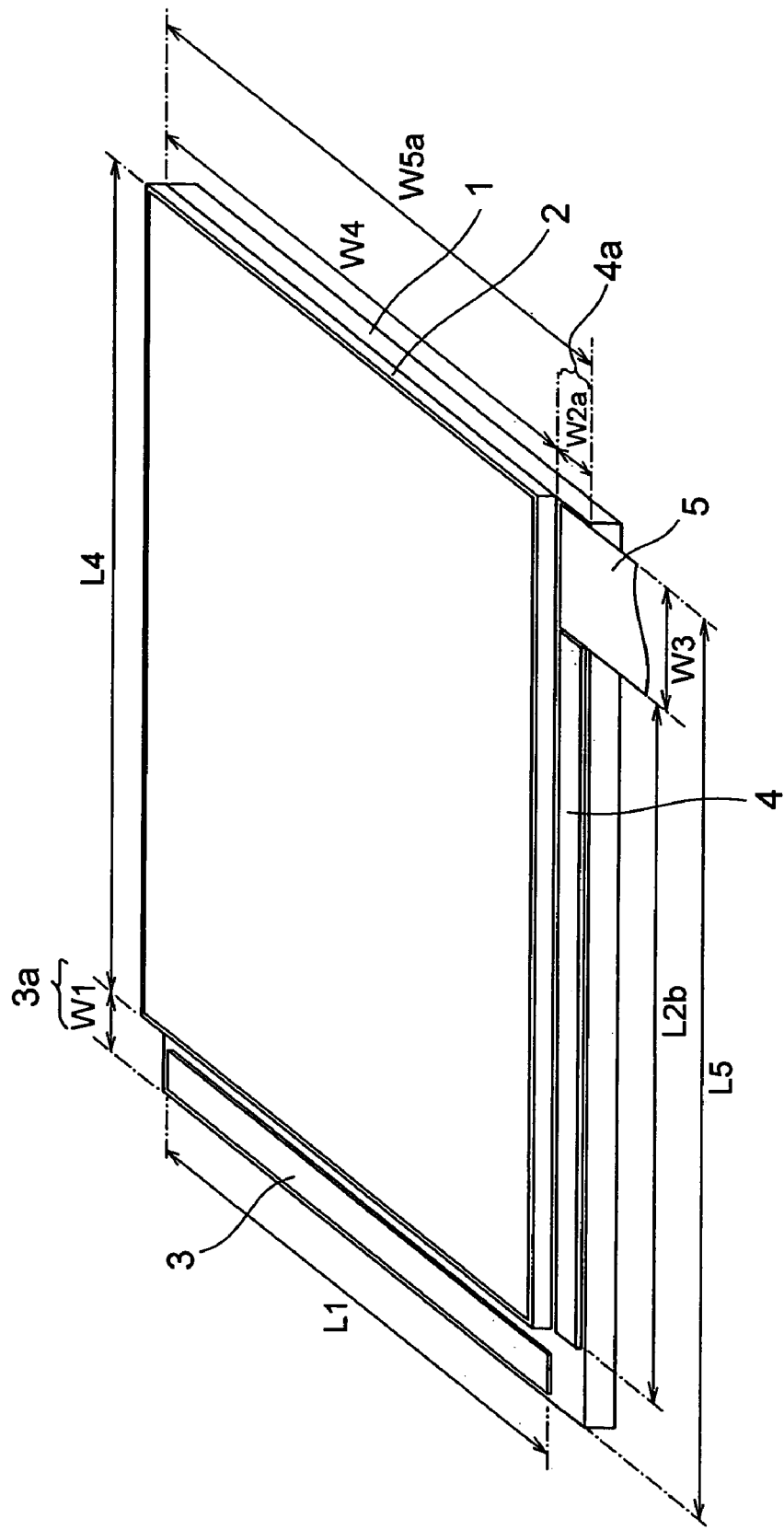
FIG. 15 is a plan view for showing the sixth embodiment of the liquid crystal display device of the present invention.
Figure 16:
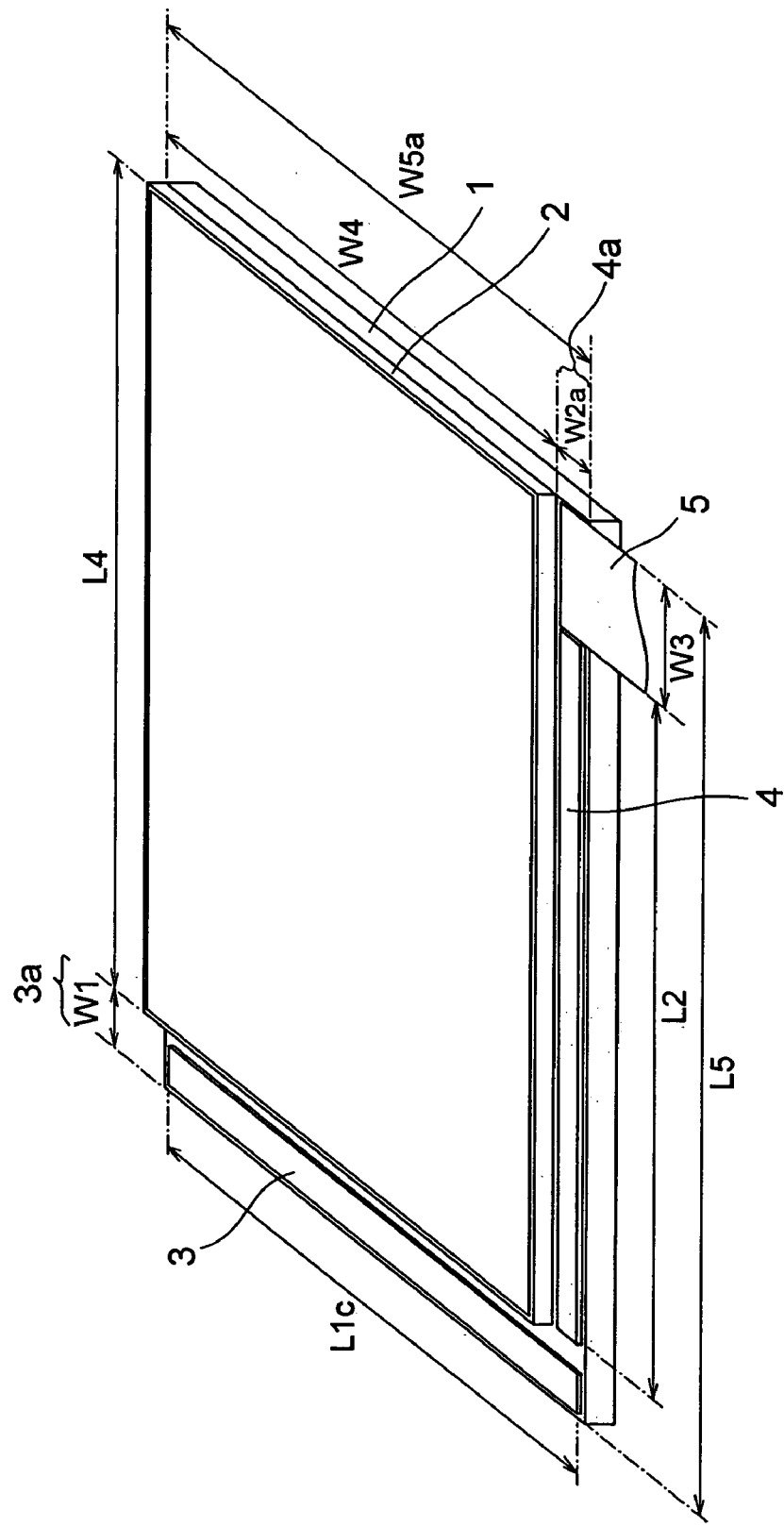
FIG. 16 is a perspective view for showing the sixth embodiment of the liquid crystal display device of the present invention.

As shown in FIG. 15, the length L2b of the signal line driving element 4 is shortened and the length L2b is set to be the length which is obtained by subtracting the width W3 of the FPC cable 5 from the length L4 of the substrate 1. Then, the shortened signal line driving element 4 is mounted to the frame part for keeping the space in the frame part 4a for mounting the FPC cable 5 onto the space. In this case, the corner of the substrate 1 between the two frame parts 3a, 4a does not contribute to mounting of the FPC cable 5, so that it is not necessary to shorten the length of the scanning line driving element 3. The length L1c of the scanning line driving element 3 is set approximate to the width W5a of the substrate 1.

In the case where the FPC cable 5 is mounted using the frame part 4a of the substrate 1, the FPC cable 5 can be mounted onto the substrate 1 by selecting the frame part 4a which requires only the short length of the FPC cable 5. In general, the price of the FPC cable 5 increases in proportion to the length, so that the cost for the FPC cable 5 can be suppressed by shortening the FPC cable 5.

Further, the sixth embodiment employs a configuration in which the connecting terminals 22, 23 of the FPC cable 5 are provided in the corner of the substrate 1 farthest from the scanning line driving element 3, which is on the frame part on the signal line electrode array side to which the signal line driving element 4 is mounted. However, it is not limited to this.

Figure 17:
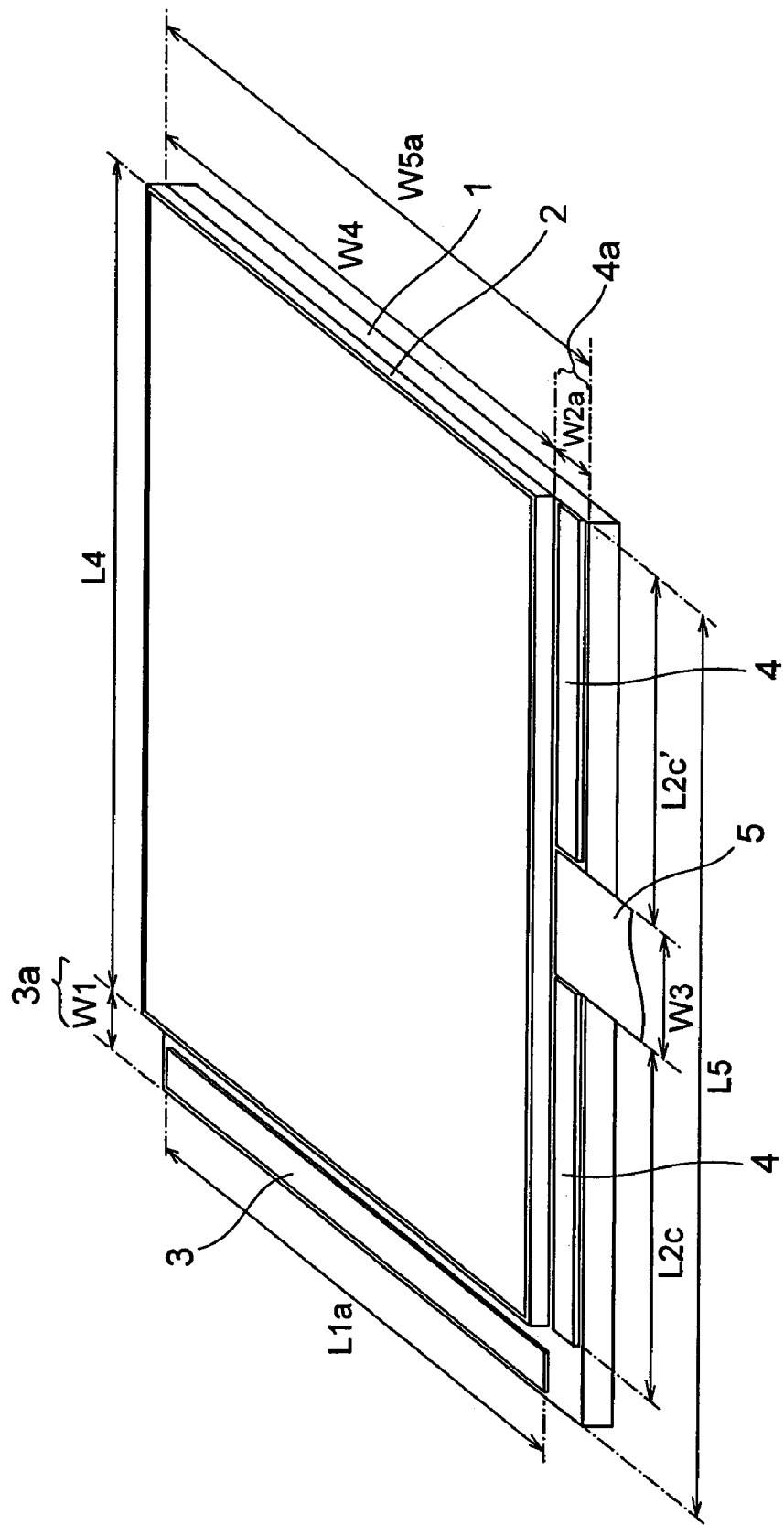
FIG. 17 is a perspective view for showing a seventh embodiment of a liquid crystal display device of the present invention.

In the embodiment shown in FIG. 17, 18, 19, the two shortened signal line driving elements 4 are mounted onto the frame part 4a with a space in between, thereby keeping a space between the adjacent signal line driving elements 4, 4. The FPC cable 5 is mounted to the space.

Figure 18:
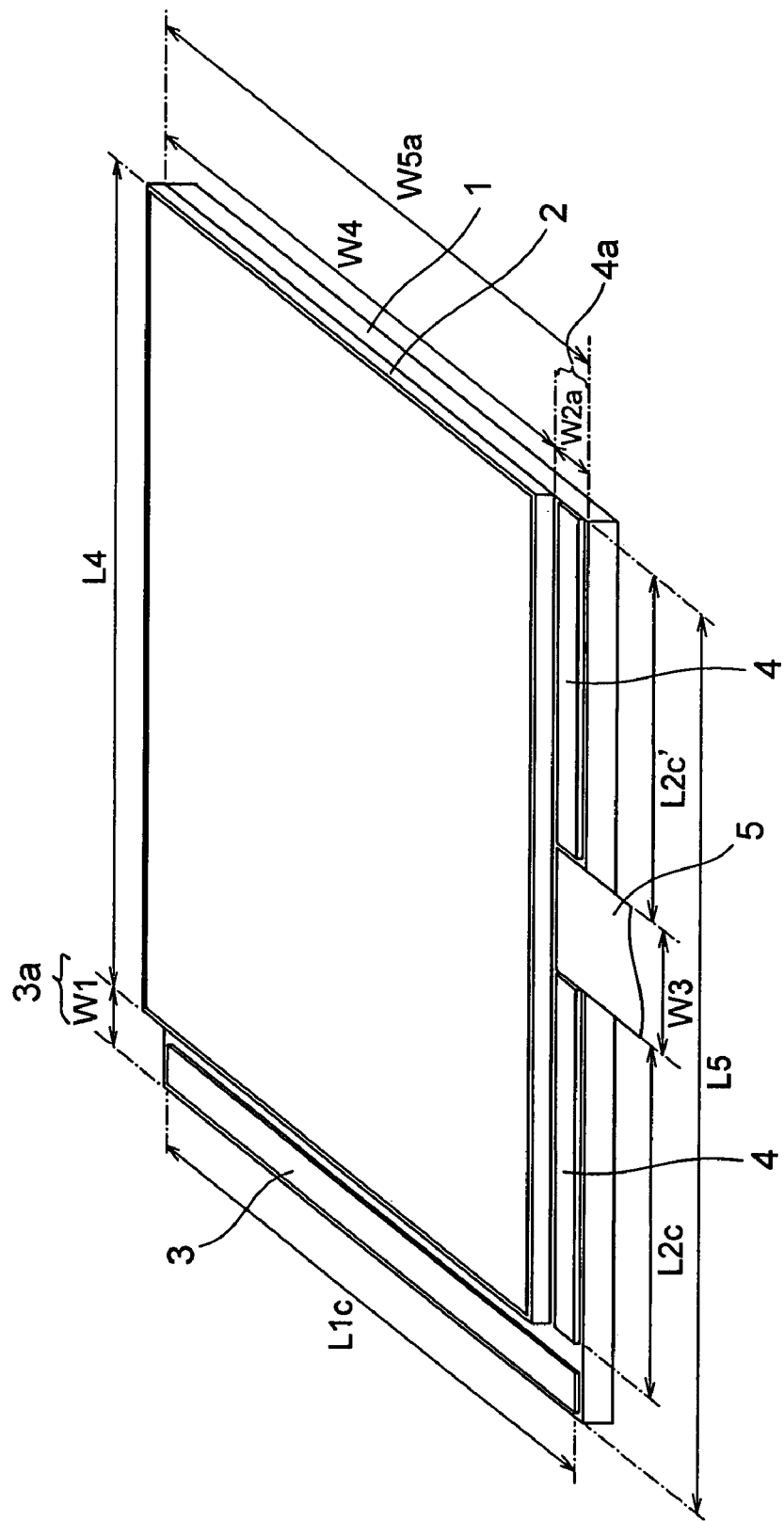
FIG. 18 is a perspective view for showing the seventh embodiment of a liquid crystal display device of the present invention.
Figure 19:
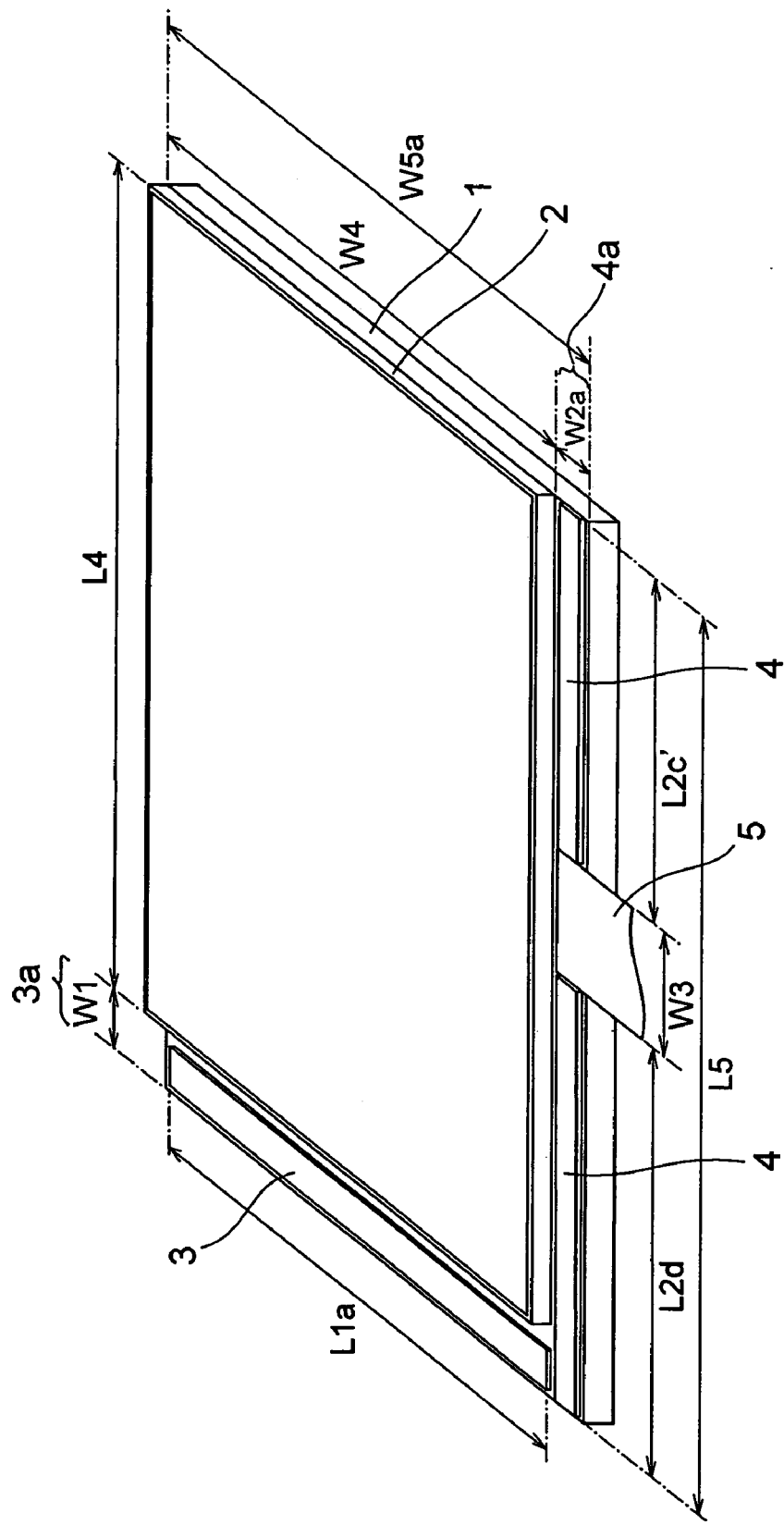
FIG. 19 is a perspective view for showing the seventh embodiment of a liquid crystal display device of the present invention.

In the case of FIG. 17, the length L1a of the scanning line driving element 3 is set to be approximate to the width W4 of the substrate 2. The length L2c of one of the signal line driving element 4 is set to be in the length which is obtained by subtracting the width W3 of the FPC cable 5 and the length L2c' of the other signal line driving element 4 from the length L4 of the substrate 2. Similarly, the length L2c' of the other signal line driving element 4 is set to be in the length which is obtained by subtracting the width W3 of the FPC cable 5 and the length L2c of the signal line driving element 4 from the length L4 of the substrate 2. In the case of FIG. 18, the length L1c of the scanning line driving element 3 is set to be approximate to the width W5 of the substrate 1. In the case of FIG. 19, the length L2d of one of the signal line driving element 4 is set to be the length which is the sum of the length L2c of the signal line driving element 4 and the width W1 of the frame part 3a shown in FIG. 17.

Although not shown in the drawings, the wirings for connecting the input terminals 19 of the scanning line driving element 3 and the connecting terminals 22 of the FPC cable 5 are formed on the glass substrate of the signal line driving element 4 and the substrate 1.

In the embodiment, the signal line driving element is divided into two and is also shortened for the width of the FPC cable. Thus, the number of the circuits in each of the divided signal line driving elements is reduced to half. Accordingly, the number of signals to be transferred during one horizontal display period becomes half, thereby reducing the driving frequency to half. Therefore, the current consumption of each of the divided signal line driving elements becomes ¼ and, further, the length of the power supply wirings within the signal line driving element 4 becomes half. As a result, the width of the entire element can be reduced by narrowing the width of the power supply wiring within the signal line driving element 4 so that the width of the frame part of the liquid crystal display panel can be narrowed. Further, it enables to suppress the drop in the power supply voltage caused by the power supply wirings within the signal line driving element 4.

Figure 20:
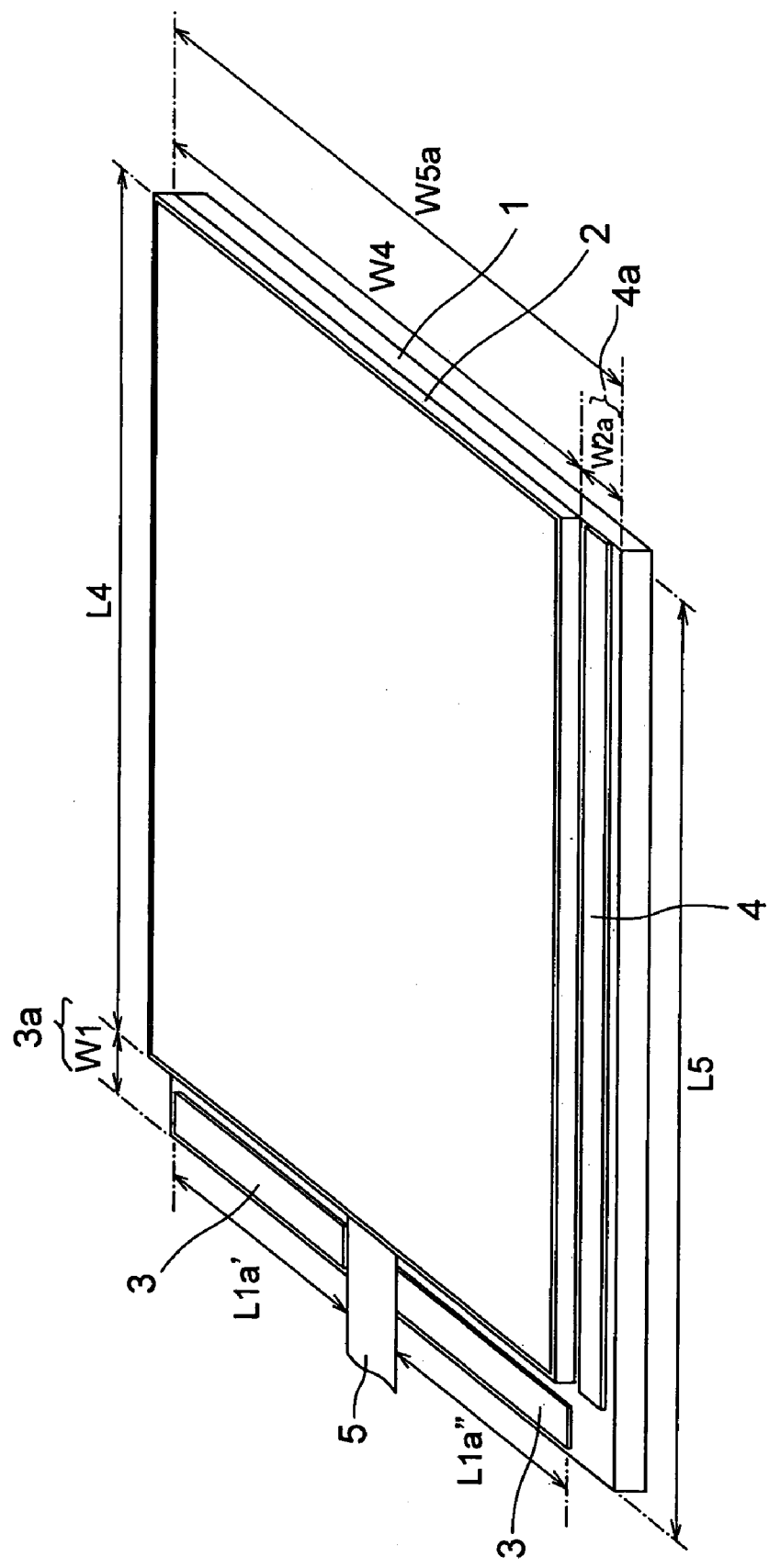
FIG. 20 is a perspective view for showing another embodiment of the present invention.

In an embodiment shown in FIG. 20, two of the shortened scanning line driving elements 3 are mounted onto the frame part 3a with a space in between, thereby keeping a space between the adjacent scanning line driving elements 3, 3. The FPC cable 5 is mounted to the space. The value (L1a'+L1a''), which is the sum of the lengths of the divided two scanning line driving elements 3, is the value obtained by subtracting the width of the FPC cable 5 from the width W4 of the substrate 2.

An embodiment shown in FIG. 21–FIG. 25 illustrates a case of using two FPC cables. In the embodiment, one of FPC cable 6 is used for supplying the control signals and power to the scanning line driving element 3 and the other FPC cable 7 is used for supplying the video signals and power to the signal line driving element 4.

Figure 21:
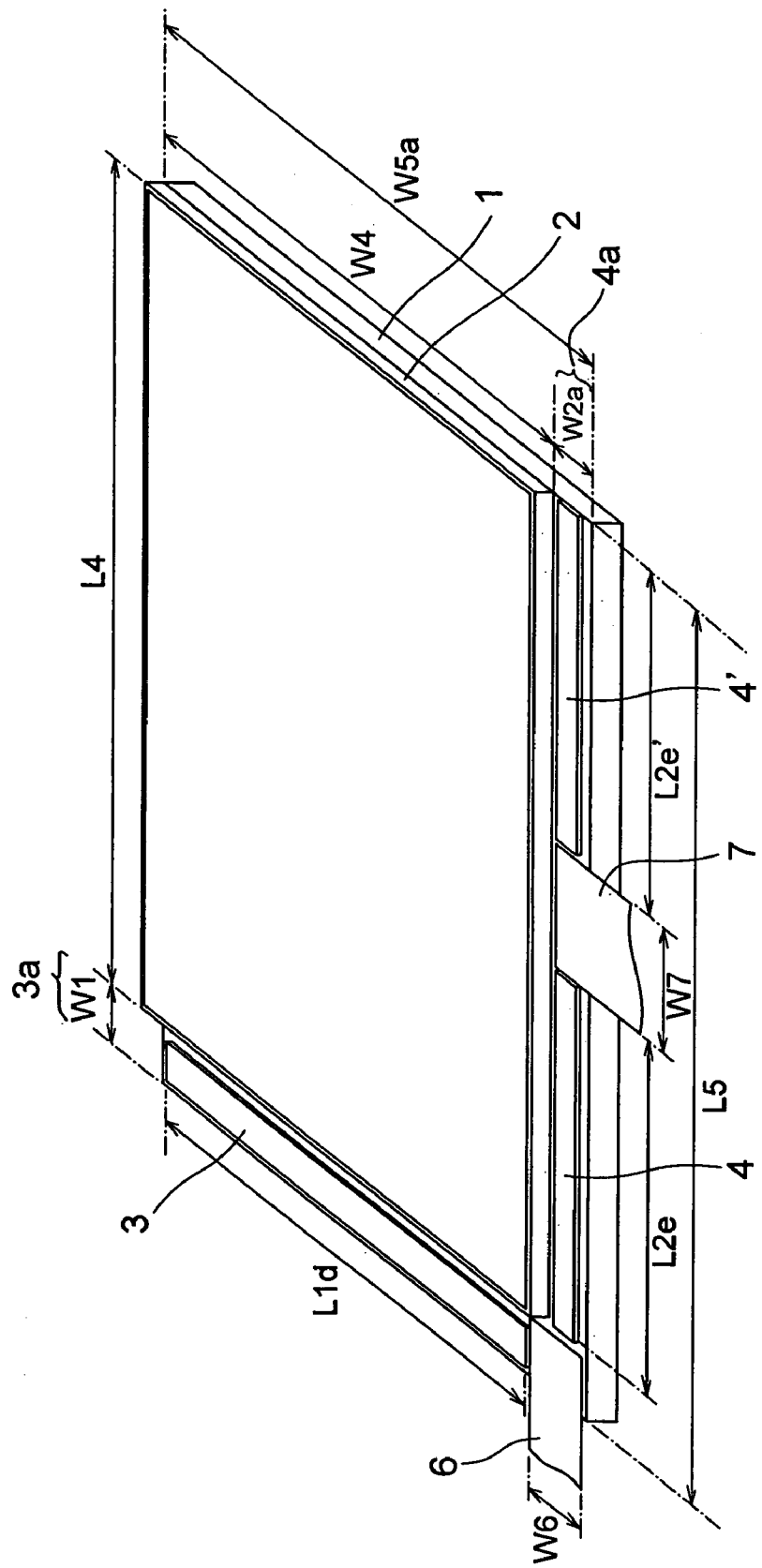
FIG. 21 is a perspective view for showing an eighth embodiment of a liquid crystal display device of the present invention.

The embodiment shown in FIG. 21 will be described. As shown in FIG. 21, functions of the two FPC cables 6, 7 are limited compared to the function of the FPC cable 5, so that the widths W6, W7 are both narrower than the width W3 of the FPC cable 5. Thus, the length L1d of the scanning line driving element 3 is set to be shorter than the width W4 of the substrate 2. That is, the length L1d is set to be the length which is obtained by subtracting the width W6 of the FPC cable 6 from the width W5 of the substrate 1. The shortened scanning line driving element 3 is mounted onto the frame part 3a so as to keep a space in the corner of the substrate 1 between the two frame parts 3a and 4a. Then, the FPC cable 6 is mounted onto the space.

Further, the two shortened signal line driving elements 4 are mounted onto the frame part 4a with a space in between, thereby keeping a space between the adjacent signal line driving elements 4, 4. The FPC cable 7 is mounted to the space.

In the case of FIG. 21, the length L2e of one signal line driving element 4 is set to be the length which is obtained by subtracting the width W7 of the FPC cable 7 and the length L2e' of the other signal line driving element 4 from the length L4 of the substrate 2. Similarly, the length L2e' of the other signal line driving element 4 is set to be the length which is obtained by subtracting the width W7 of the FPC cable 7 and the length L2e of the signal line driving element 4 from the length L4 of the substrate 2.

Figure 22:
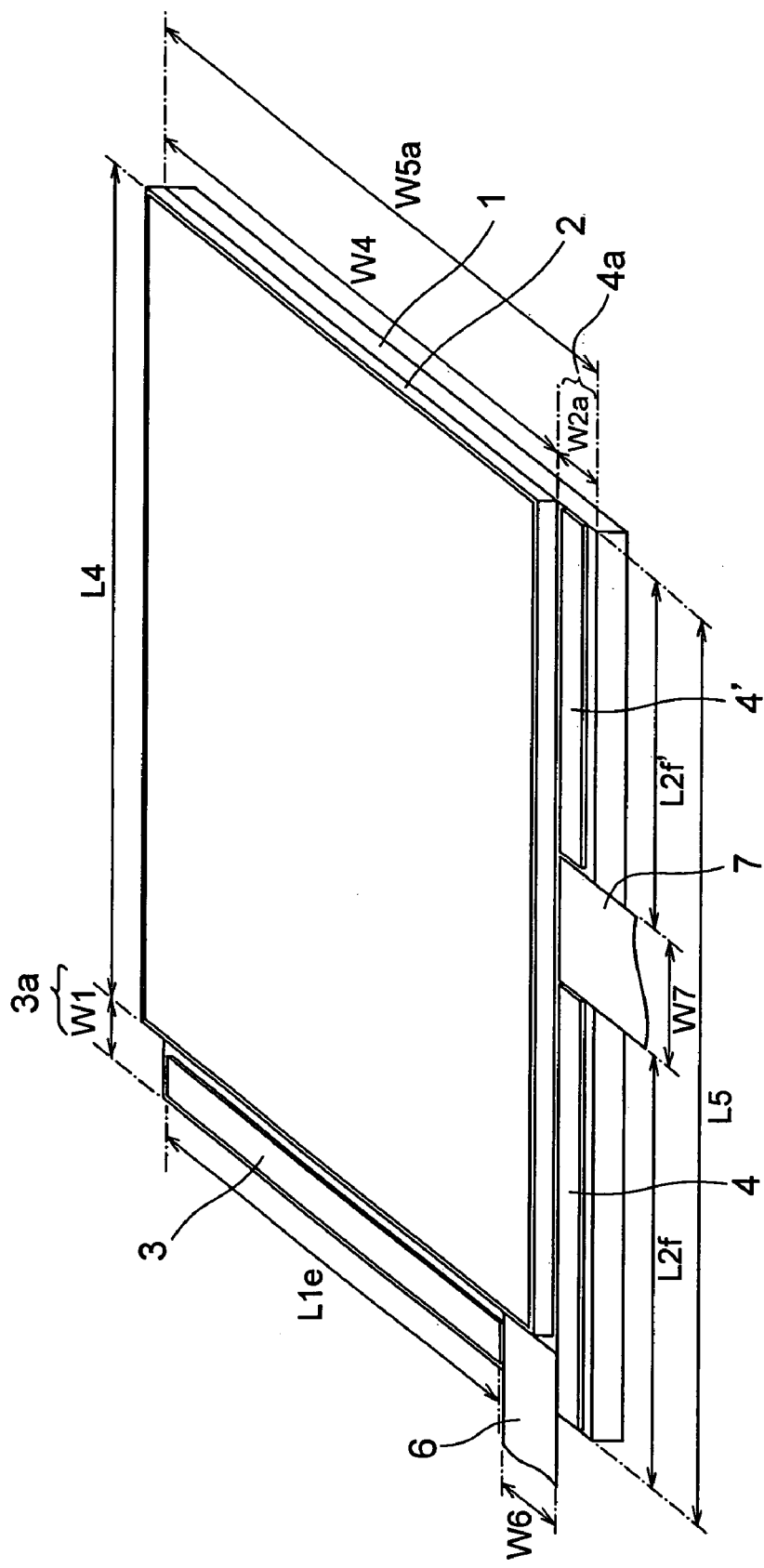
FIG. 22 is a perspective view for showing the eighth embodiment of a liquid crystal display device of the present invention.

The embodiment shown in FIG. 22 will be described. As shown in FIG. 22, functions of the two FPC cables 6, 7 are limited compared to the function of the FPC cable 5, so that the widths W6, W7 are both narrower than the width W3 of the FPC cable 5. Thus, the length L1e of the scanning line driving element 3 is set to be shorter than the width W4 of the substrate 2. That is, the length L1e is set to be the length which is obtained by subtracting the width W6 of the FPC cable 6 and the width W2a of the frame part 4a from the width W5a of the substrate 1. The shortened scanning line driving element 3 is mounted onto the frame part 3a so as to keep a space in frame part 3a. Then, the FPC cable 6 is mounted onto the space.

Further, the two shortened signal line driving elements 4 are mounted onto the frame part 4a with a space in between, thereby keeping a space between the adjacent signal line driving elements 4, 4. The FPC cable 7 is mounted to the space.

In the case of FIG. 22, the length L2$f$ of one signal line driving element 4 is set to be the length which is obtained by subtracting the width W7 of the FPC cable 7 and the length L2$f'$ of the other signal line driving element 4 from the length L5 of the substrate 1. Similarly, the length L2$f'$ of the other signal line driving element 4 is set to be the length which is obtained by subtracting the width W7 of the FPC cable 7 and the length L2$f$ of the signal line driving element 4 from the length L5 of the substrate.

Figure 23:
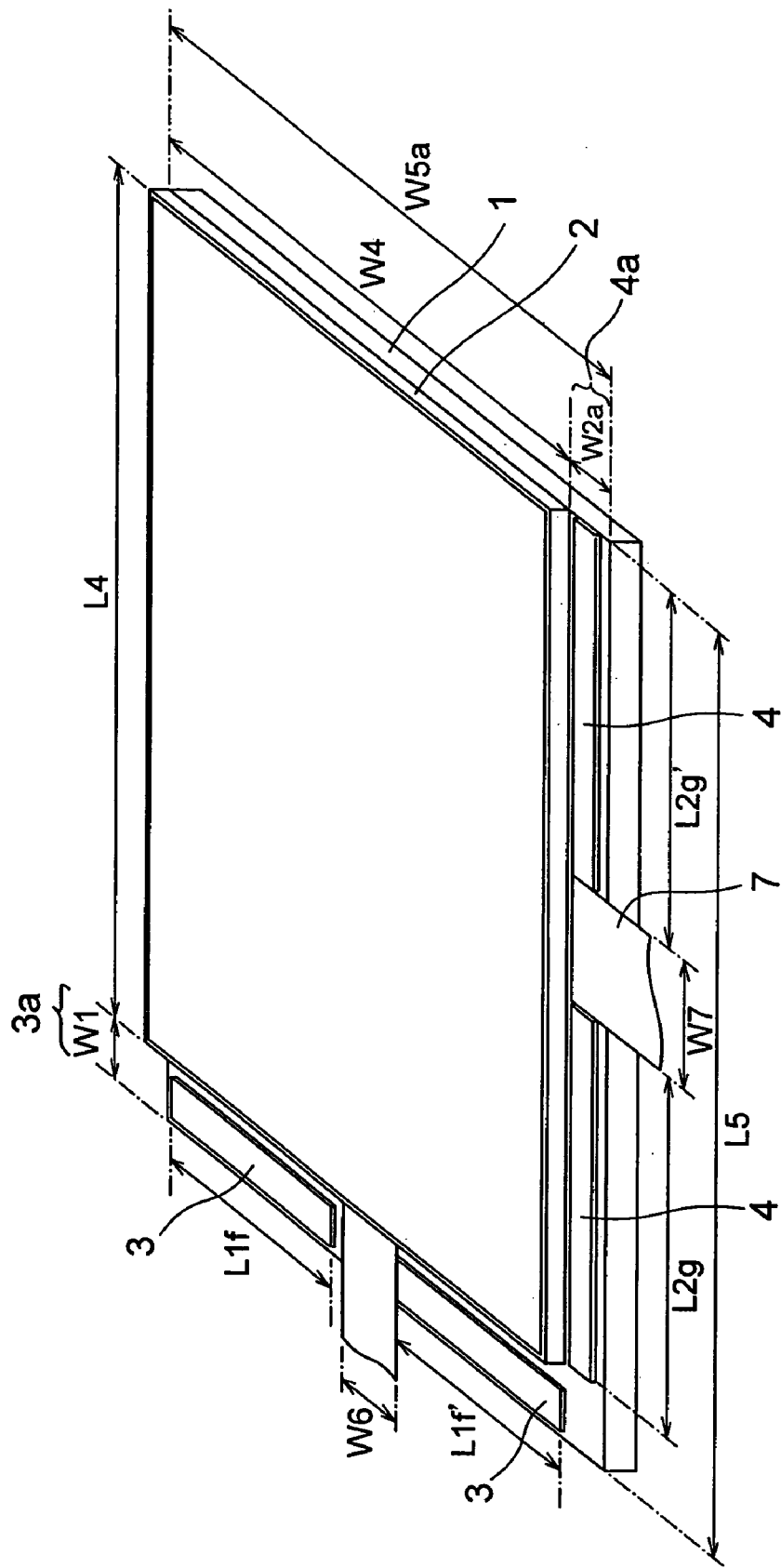
FIG. 23 is a perspective view for showing the eighth embodiment of a liquid crystal display device of the present invention.

The embodiment shown in FIG. 23 will be described. As shown in FIG. 23, functions of the two FPC cables 6, 7 are limited compared to the function of the FPC cable 5, so that the widths W6, W7 are both narrower than the width W3 of the FPC cable 5.

Thus, the two shortened scanning line driving elements 3 are mounted onto the frame part 3$a$ with a space in between, thereby keeping a space between the adjacent scanning line driving elements 3, 3. The FPC cable 6 is mounted onto the space. Further, the two shortened signal line driving elements 4 are mounted onto the frame part 4$a$ with a space in between, thereby keeping a space between the adjacent signal line driving elements 4, 4. The FPC cable 7 is mounted to the space.

In the case of FIG. 23, the length L1$f$ of one scanning line driving element 3 is set to be the length which is obtained by subtracting the width W6 of the FPC cable 6 and the length L1$f'$ of the other scanning line driving element 3 from the width W4 of the substrate 2. Similarly, the length L1$f'$ of the other scanning line driving element 3 is set to be the length which is obtained by subtracting the width W6 of the FPC cable 6 and the length L1$f$ of the scanning line driving element 3 from the width W4 of the substrate 2.

The length L2$g$ of one signal line driving element 4 is set to be the length which is obtained by subtracting the width W7 of the FPC cable 7 and the length L2$g'$ of the other signal line driving element 4 from the length L4 of the substrate 1. Similarly, the length L2$g'$ of the other signal line driving element 4 is set to be the length which is obtained by subtracting the width W7 of the FPC cable 7 and the length L2$g$ of the signal line driving element 4 from the length L4 of the substrate 2.

Figure 24:
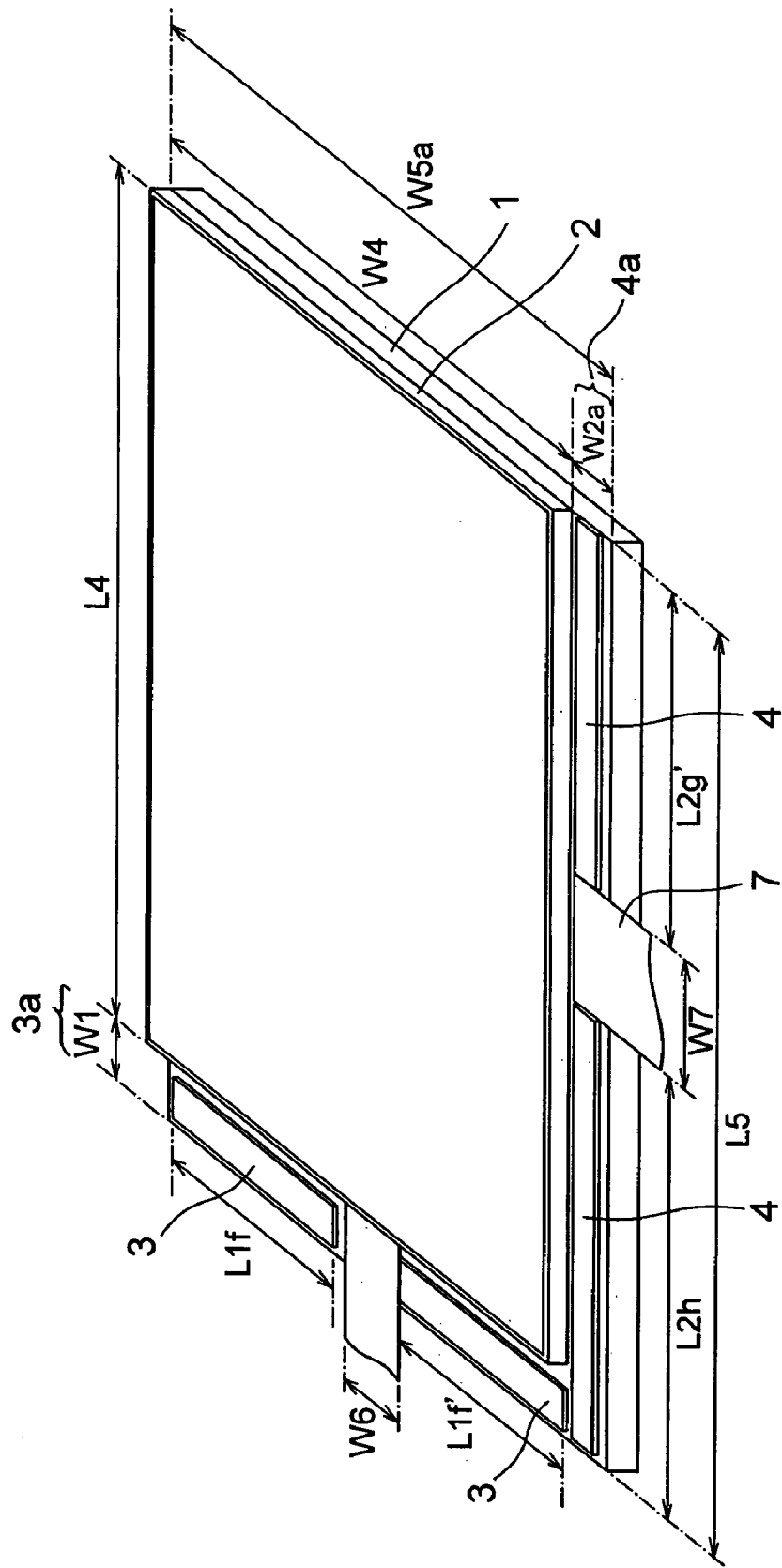
FIG. 24 is a perspective view for showing the eighth embodiment of a liquid crystal display device of the present invention.

In the embodiment shown in FIG. 24, one signal line driving element 4 shown in FIG. 23 is extended to the corner of the substrate 1 between the two frame parts 3$a$, 4$a$. The length L2$h$ of the extended signal line driving element 4 is set to be the length which is obtained by adding the width W1 of the frame part 3$a$ to the length L2$g$ of the signal line driving element 4 shown in FIG. 23.

Figure 25:
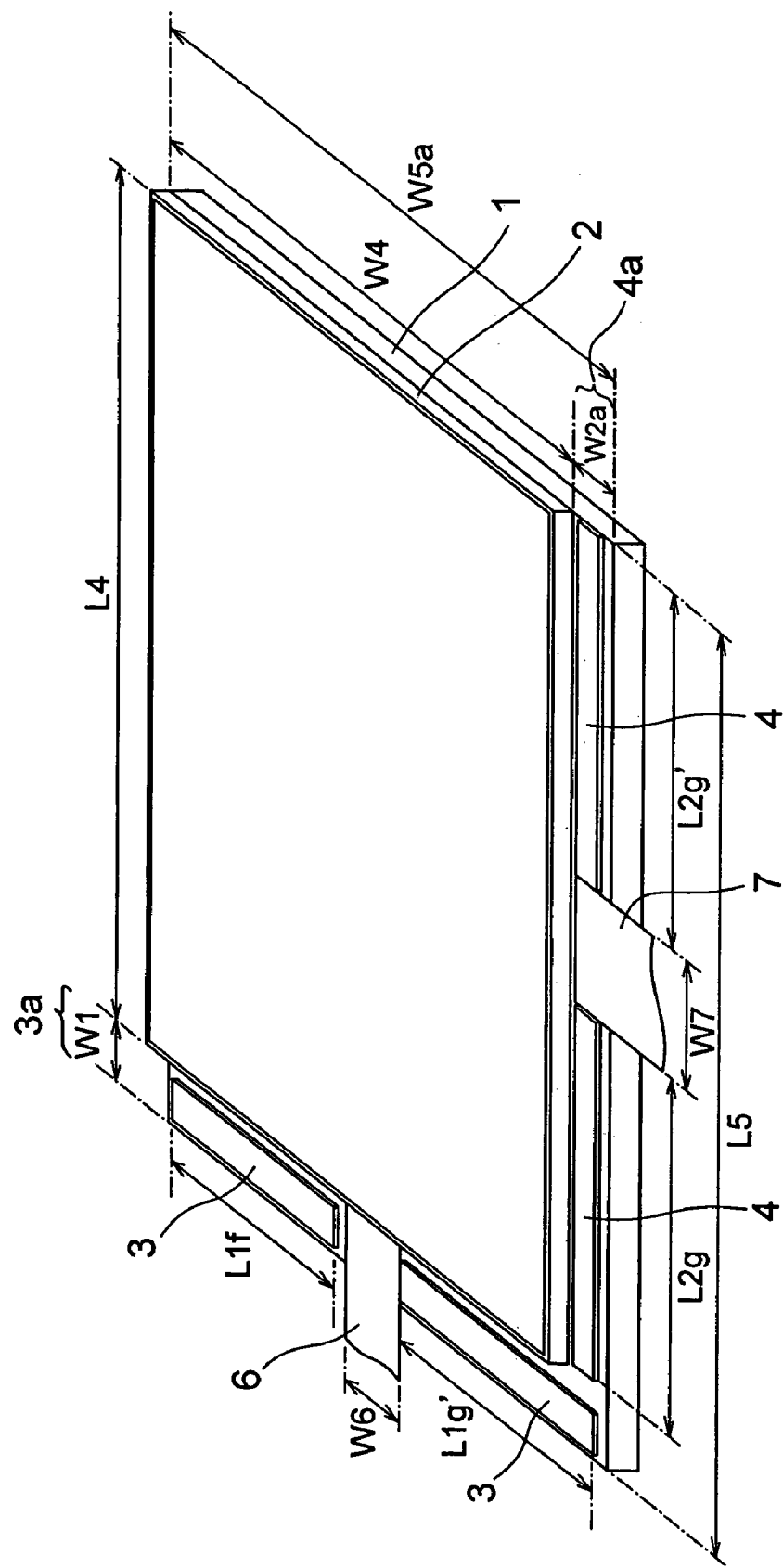
FIG. 25 is a perspective view for showing the eighth embodiment of a liquid crystal display device of the present invention.

In the embodiment shown in FIG. 25, one scanning line driving element 3 shown in FIG. 23 is extended to the corner of the substrate 1 between the two frame parts 3$a$, 4$a$. The length L$g'$ of the extended scanning line driving element 3 is set to be the length which is obtained by adding the width W2$a$ of the frame part 4$a$ to the length L1$f$ of the scanning line driving element 3 shown in FIG. 23.

In the embodiment shown in FIG. 21–FIG. 25, the FPC cable is divided into two so that the number of the wirings formed on each of the FPC cables 6, 7 can be reduced. Thus, the size of the FPC cables 6, 7 can be minimized. Further, it is not necessary to additionally form extra wirings in one of the scanning line driving elements 3 and one of the signal line driving elements 4 for supplying the signals and voltages to the other scanning line driving element 3 and the other signal line driving element 4, so that the size can be minimized by narrowing the widths of the scanning line driving element 3 and the signal line driving element 4. Therefore, the widths of the two frame parts 3$a$ and 4$a$ can be narrowed.

Figure 26:
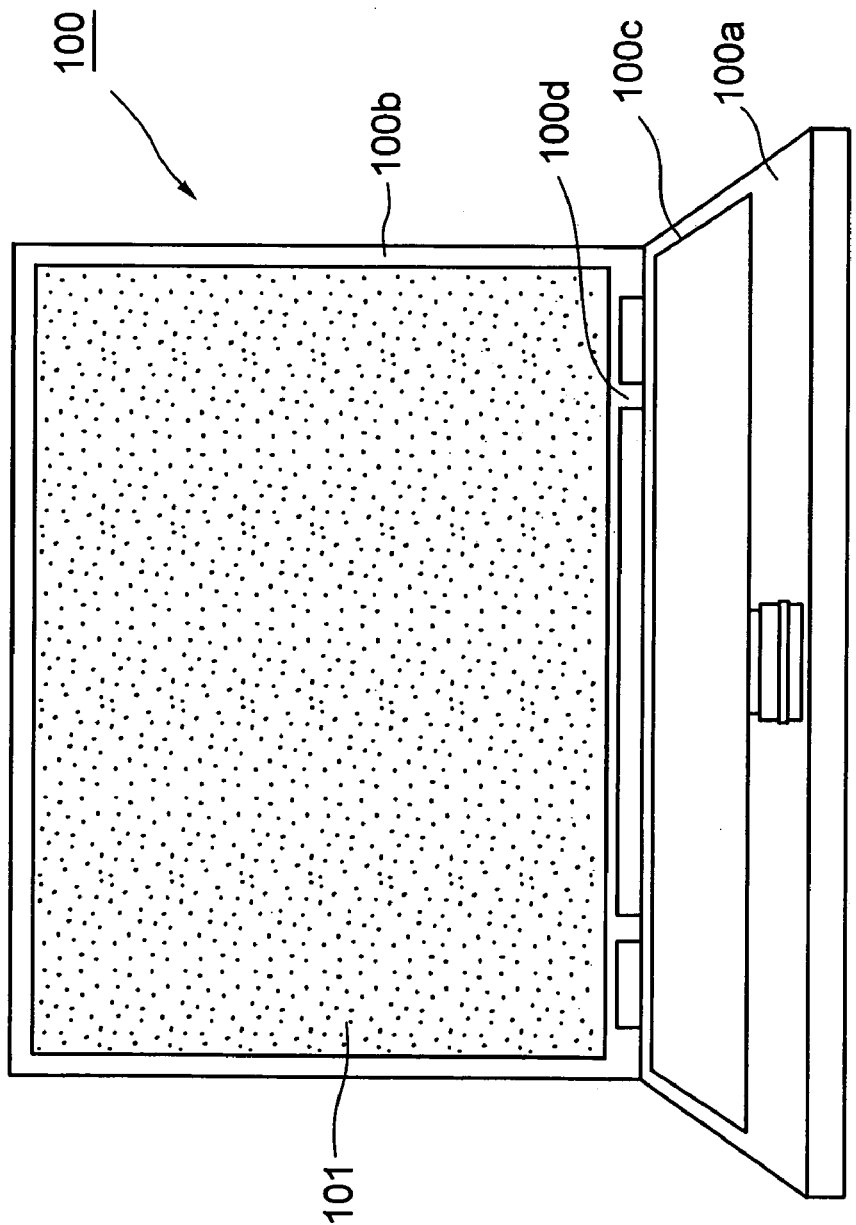
FIG. 26 is a perspective view for showing a first embodiment of a portable terminal of the present invention.

As shown in FIG. 26, a notebook personal computer 100 as one of portable terminals comprises an operation unit 100$a$ with a built-in driving circuit such as a CPU and a display unit 100$b$ for displaying electronic information. The display unit 100$b$ is mounted to the operation unit 100$a$ by a hinge 100$d$ to be opened and closed. A keyboard 100$c$ for inputting/outputting data is provided to the operation unit 100$b$. A display screen 101 appears on the front face of the display unit 100$b$ when being opened. In the display screen 101, electronic information is displayed as visible information.

The display device according to the embodiments of the invention is mounted to the display unit 100$b$ as the display screen 101, and the flexible flat cables 5, 6, 7 of the display device according to the embodiment of the present invention are connected to the driving circuit within the operation unit 100$a$.

When a command is inputted by operating the keyboard 100$c$ of the operation unit 100$a$, the signals and power are supplied from the driving circuit of the operation unit 100$a$ to the scanning line driving element 3 and the signal line driving element 4 through the flexible flat cables 5, 6, 7, thereby actuating the scanning line driving element 3 and the signal line driving element 4. The scanning line driving element 3 selects the scanning lines 16 and the signal line driving element 4 outputs the video signals to the selected signal lines 17. According to this action, electronic information as visible information is displayed by the display pixels in the display pixel region 2$a$, that is, on the display screen 101. The display device according to the above-described first to eighth embodiments can be applied to the display device as the display screen 101.

Each of the embodiments has been described above, however, it is needlessly to say that the present invention is not limited to these embodiments. For example, the liquid crystal display device may be other display device such as an organic EL display device and the like and the glass substrate and the Si-TFT may be a plastic substrate and an organic TFT.

In the case of using a glass substrate for the substrate of the display panel and using a heat-resistant glass substrate for the substrate of the driving circuit element, if the substrate with different thermal expansion coefficients are laminated, the laminated part is easily separated since the lengths of expansion/contraction of each substrate differ from each other when there is a change in the temperatures.

Further, the influence becomes prominent when the total length of the substrate 1 and the substrate of the driving element becomes about the same as the longitudinal dimension or the lateral dimension of the display panel. Therefore, it is desirable to use the substrates having almost the same thermal expansion coefficient with each other for the substrate of the display panel and the substrate of the driving circuit element.

What is claimed is:

1. A display device, comprising:
    a main substrate having a plurality of display pixels being arranged in matrix at intersection points of a plurality of scanning lines and a plurality of signal lines, a scanning line electrode array formed with a plurality of electrodes being connected to a plurality of the scanning lines, a signal line electrode array formed with a plurality of electrodes being connected to a plurality of the signal lines, and a frame part formed in an edge of the substrate along the scanning line electrode array and the signal line electrode array;

a scanning line driving element having a driving circuit for electrically selecting the scanning lines by being mounted to the frame part along the scanning line electrode array;

a signal line driving element having a driving circuit for electrically selecting the signal lines by being mounted to the frame part along the signal line electrode array; and a flexible flat cable for supplying a signal and a power to the driving circuits of the scanning line driving element and the signal line driving element, wherein the scanning line driving element and the signal line driving element have the driving circuits formed with polycrystalline silicon thin-film transistors on a sub-substrate whose thermal expansion coefficient is approximate to that of the main substrate;

a width of the frame part to which the signal line driving element is mounted is approximate to a width of the signal line driving element, and a width of the frame part to which the scanning line driving element is mounted is approximate to a width of the scanning line driving element; and a length of at least the scanning line driving element or the signal line driving element is set shorter than the respective frame part so as to keep a space for mounting the flexible flat cable.

2. The display device according to claim 1, wherein a plurality of output terminals of the driving circuit provided to the scanning line driving element are arranged in a direction along the scanning line electrode array, and a plurality of input terminals of the driving circuit provided to the scanning line driving element are arranged on a same side or an opposite side where the output terminals are arranged.

3. The display device according to claim 1, wherein a plurality of output terminals of the driving circuit provided to the signal line driving element are arranged in a direction along the signal line electrode array, and a plurality of input terminals of the driving circuit provided to the signal line driving element are arranged on a same side or an opposite side where the output terminals are arranged.

4. The display device according to claim 1, wherein:

a pitch of a plurality of the electrodes in the scanning line electrode array is narrowed according to a pitch of a plurality of the output terminals provided to the driving circuit of the scanning line driving element which is shortened; and as for a plurality of the electrodes in the scanning line electrode array, the longer a distance from the input terminal of the shortened scanning line driving element to the output terminal, the shorter a length of a link line used for connecting to the scanning line becomes.

5. The display device according to claim 4, wherein, as for the link lines, in addition to a condition of the length, the longer the distance from the input terminal to the output terminal, the wider a wiring width becomes.

6. The display device according to claim 1, wherein:

a pitch of a plurality of the electrodes in the signal line electrode array is narrowed according to a pitch of a plurality of the output terminals provided to the driving circuit of the signal line driving element which is shortened; and as for a plurality of the electrodes in the signal line electrode array, the longer a distance from the input terminal of the shortened signal line driving element to the output terminal, the shorter a length of a link line used for connecting to the signal line becomes.

7. The display device according to claim 6, wherein, as for the link lines, in addition to a condition of the length, the longer the distance from the input terminal to the output terminal, the wider a wiring width becomes.

8. The display device according to claim 1, wherein at least either the scanning line driving element or the signal line driving element is divided into two or more for mounting the flexible flat cable in between the divided scanning line driving elements or the divided signal line driving elements.

9. The display device according to claim 1, wherein the length of the scanning line driving element is either equal or shorter than a value which is obtained by subtracting the width of the flexible flat cable from a sum of the length of the scanning line electrode array and the width of the frame part on the signal line electrode array side or equal or shorter than a value which is obtained by subtracting the width of the flexible flat cable from the length of the scanning line electrode array.

10. The display device according to claim 1, wherein the length of the signal line driving element is either equal or shorter than a value which is obtained by subtracting the width of the flexible flat cable from a sum of the length of the signal line electrode array and the width of the frame part on the scanning line electrode array side or equal or shorter than a value which is obtained by subtracting the width of the flexible flat cable from the length of the signal line electrode array.

11. The display device according to claim 8, comprising a first and a second flexible flat cable with a narrowed width, wherein:

one of the divided scanning line driving elements, the first flexible flat cable as one of the flexible flat cables, and the remainder of the divided scanning line driving elements are disposed in the frame part on the scanning line electrode array side by setting the output terminal pitch of the driving circuit provided to the divided two scanning line driving elements narrower than the pitch of the scanning lines so that a sum of the lengths of the divided two scanning line driving elements becomes equal or shorter than a value obtained by subtracting a width of the first flexible flat cable from the length of the scanning line electrode array; and the signal line driving element and the second flexible flat cable as a remainder are disposed in the frame part on the signal line electrode array side by setting the output terminal pitch of the driving circuit provided to the signal line driving element narrower than the pitch of the signal lines so that a length of the signal line driving element becomes equal or shorter than a value obtained by subtracting a width of the second flexible flat cable from the length of the signal line electrode array.

12. The display device according to claim 11, wherein a sum of the lengths of the divided two scanning line driving elements is set equal or shorter than a value which is obtained by subtracting the width of the first flexible flat cable from a sum of the length of the scanning line electrode array and the width of the frame part on the signal line electrode array side.

13. The display device according to claim 11, wherein the length of the signal line driving element is set equal or shorter than a value which is obtained by subtracting the width of the second flexible flat cable from a sum of the length of the signal line electrode array and the width of the frame part on the scanning line electrode array side.

14. The display device according to claim 8, comprising a first and a second flexible flat cable with a narrowed width, wherein:
the scanning line driving element and the first flexible flat cable as one of the flexible flat cables are disposed in the frame part on the scanning line electrode array side by setting the output terminal pitch of the driving circuit provided to the scanning line driving element narrower than the pitch of the scanning lines of the scanning line electrode array so that the length of the scanning line driving element becomes equal or shorter than a value obtained by subtracting the width of the first flexible flat cable from the length of the scanning line electrode array; and
one of the divided signal line driving elements, the second flexible flat cable as a remainder, and the remainder of the divided signal line driving elements are disposed in the frame part on the signal line electrode array side by setting the output terminal pitch of the driving circuit provided to the divided two signal line driving elements narrower than the pitch of the signal lines of the signal line electrode array so that a sum of the lengths of the divided two signal line driving elements becomes equal or shorter than a value obtained by subtracting the width of the second flexible flat cable from the length of the signal line electrode array.

15. The display device according to claim 14, wherein the length of the scanning line driving element is set equal or shorter than a value which is obtained by subtracting the width of the first flexible flat cable from a sum of the length of the scanning line electrode array and the width of the frame part on the signal line electrode array side.

16. The display device according to claim 14, wherein a sum of the lengths of the divided two signal line driving elements is set equal or shorter than a value which is obtained by subtracting the width of the second flexible flat cable from a sum of the length of the signal line electrode array and the width of the frame part on the scanning line electrode array side.

17. The display device according to claim 8, comprising a first and a second flexible flat cable with a narrowed width, wherein:
the output terminal pitch of the driving circuit provided to the divided two scanning line driving elements is set narrower than the pitch of the scanning lines of the scanning line electrode array so that a sum of the lengths of the divided two scanning line driving elements becomes equal or shorter than a value obtained by subtracting the width of the first flexible flat cable from the length of the scanning line electrode array; and
the output terminal pitch of the driving circuit provided to the divided two signal line driving elements is set narrower than the pitch of the signal lines of the signal line electrode array so that a sum of the lengths of the divided two signal line driving elements becomes equal or shorter than a value obtained by subtracting the width of the second flexible flat cable from the length of the signal line electrode array.

18. The display device according to claim 17, wherein a sum of the lengths of the divided two scanning line driving elements is set equal or shorter than a value which is obtained by subtracting the width of the first flexible flat cable from a sum of the length of the scanning line electrode array and the width of the frame part on the signal line electrode array side.

19. The display device according to claim 17, wherein a sum of the lengths of the divided two signal line driving elements is set equal or shorter than a value which is obtained by subtracting the width of the second flexible flat cable from a sum of the length of the signal line electrode array and the width of the frame part on the scanning line electrode array side.

20. The display device according to claim 1, wherein:
the scanning line driving element, while being extended to an edge of the frame part on the signal line electrode array side, comprises input terminals connected to the flexible flat cable, output terminals connected to the scanning line electrode array, and wirings and junction terminals for connecting the flexible flat cable and the signal line driving element; and
the junction terminals are arranged in an extended part of the scanning line driving element where the output terminals are arranged.

21. The display device according to claim 1, wherein:
the signal line driving element, while being extended to an edge of the frame part on the scanning line electrode array side, comprises input terminals connected to the flexible flat cable, output terminals connected to the signal line electrode array, and wirings and junction terminals for connecting the flexible flat cable and the scanning line driving element; and
the junction terminals are arranged in an extended part of the signal line driving element where the output terminals are arranged.

22. The display device according to claim 1, wherein a width of the substrate provided to the driving element is 4 mm or less.

23. The display device according to claim 1, further comprising a counter substrate which opposes the main substrate with a liquid crystal layer in between, wherein
the counter substrate functions as the display pixel region.

24. A portable terminal comprising a display device for displaying electronic information, wherein
the display device comprises:
a main substrate having a plurality of display pixels being arranged in matrix at intersection points of a plurality of scanning lines and a plurality of signal lines, a scanning line electrode array formed with a plurality of electrodes being connected to a plurality of the scanning lines, a signal line electrode array formed with a plurality of electrodes being connected to a plurality of the signal lines, and a frame part formed in an edge of the substrate along the scanning line electrode array and the signal line electrode array;
a scanning line driving element having a driving circuit for electrically selecting the scanning lines by being mounted to the frame part along the scanning line electrode array; and
a signal line driving element having a driving circuit for electrically selecting the signal lines by being mounted to the frame part along the signal line electrode array;
a flexible flat cable for supplying a signal and a power to the driving circuits of the scanning line driving element and the signal line driving element, wherein
the scanning line driving element and the signal line driving element have the driving circuits formed with polycrystalline silicon thin-film transistors on a sub-substrate whose thermal expansion coefficient is approximate to that of the main substrate;

a width of the frame part to which the signal line driving element is mounted is approximate to a width of the signal line driving element, and a width of the frame part to which the scanning line driving element is mounted is approximate to a width of the scanning line driving element; and a length of at least the scanning line driving element or the signal line driving element is set shorter than the respective frame part so as to keep a space for mounting the flexible flat cable.

* * * * *